(12) United States Patent
Tong

(10) Patent No.: US 7,651,109 B2
(45) Date of Patent: Jan. 26, 2010

(54) FOLDING MECHANISM AND LAND VEHICLE COMPRISING SAME

(75) Inventor: Wai Lop Tong, Hong Kong (CN)

(73) Assignee: Dynacraft BSC LLC, San Rafael, CA (US)

( * ) Notice: Subject to any disclaimer, the term of this patent is extended or adjusted under 35 U.S.C. 154(b) by 349 days.

(21) Appl. No.: 11/424,252

(22) Filed: Jun. 15, 2006

(65) Prior Publication Data

US 2007/0290479 A1    Dec. 20, 2007

(51) Int. Cl.
    *B62K 15/00* (2006.01)
(52) U.S. Cl. .................................. 280/278; 280/287
(58) Field of Classification Search ............... 280/278, 280/287
    See application file for complete search history.

(56) References Cited

U.S. PATENT DOCUMENTS

| | | | |
|---|---|---|---|
| 5,029,666 A | 7/1991 | Baldoni | |
| 5,967,537 A | 10/1999 | Chang | |
| 6,364,335 B1 | 4/2002 | Mombelli | |
| 6,641,159 B1 | 11/2003 | Fan | |
| 6,688,625 B1 * | 2/2004 | Schreuder et al. | 280/260 |
| 7,229,089 B2 * | 6/2007 | Mihelic | 280/278 |
| 7,445,224 B2 * | 11/2008 | Whyte | 280/278 |

FOREIGN PATENT DOCUMENTS

GB            1580048 A1    11/1980

* cited by examiner

*Primary Examiner*—Lesley D Morris
*Assistant Examiner*—Marc A Scharich
(74) *Attorney, Agent, or Firm*—William J. Sapone; Coleman Sudol Sapone P.C.

(57) ABSTRACT

There is provided a foldable land vehicle comprising an elongate main frame generally defining a longitudinal axis running from a front end of the vehicle to a rear end of the vehicle, a front part including a front wheel, a rear part including a rear wheel, a first joint means for connecting the front part to the main frame and for folding the front part to a lateral side of the main frame, and a second joint means for connecting the rear part to said main frame and for folding the rear part to below the main frame.

16 Claims, 40 Drawing Sheets

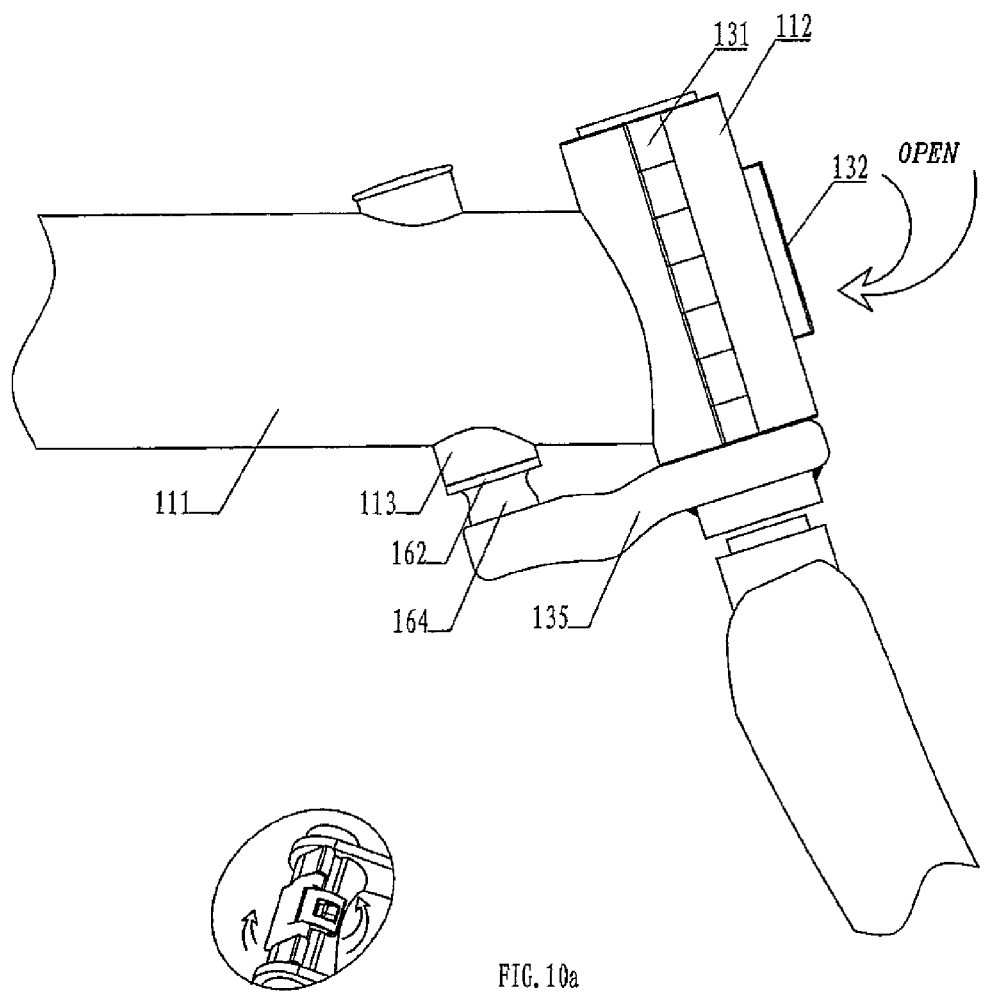
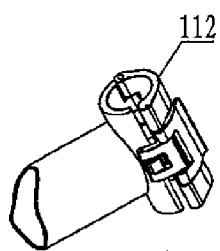
FIG. 10a
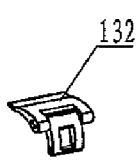
FIG. 10b
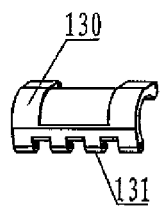
FIG. 10c
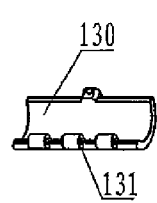
FIG. 10d FIG. 10e
FIG. 10

FOLDING MECHANISM AND LAND VEHICLE COMPRISING SAME

FIELD OF THE PRESENT INVENTION

The present invention is concerned with a folding mechanism and in particular a land vehicle such as a bicycle, a motor bicycle, an exercise bicycle or the like comprising such a folding mechanism.

BACKGROUND OF THE PRESENT INVENTION

There are a variety of land vehicles such as bicycles. It is common for cyclists to ride bicycles in a remote location from home. However, it is often cumbersome to transport the bicycles to the remote location. It is because most regular bicycles are often too large or too long to fit into the trunk of an average size passenger sedan. As such, transporting bicycles often requires securing them to a luggage rack installed on the top of the sedan or a bicycle rack hung to the back of the sedan. In view of this problem, some bicycles are designed such that the front wheel thereof is removable from the main body of the bicycle, and the trunk might then fit the bicycle separated into the main body and the front wheel.

There have been numerous proposals to produce a foldable bicycle in order to reduce the size thereof when it is not in use. For example, as mentioned above the bicycle may be designed such that the front wheel may be removable from the bicycle. Although the removal of the front wheel does indeed reduce the length of a bicycle, the reduction in length is not significant enough to reduce the overall length to, for example, store it in a suitcase or in the trunk of a smaller family sedan. Also, once the wheel is separated from the bicycle, it would become rather cumbersome to store the two separated parts of the bicycle.

There have been other proposals to introduce a joint at the main frame of a bicycle such that the bicycle can be folded thereat by swinging the front half of the bicycle sideway and fold it against the rear half of the bicycle. However, such a folding mechanism suffers from a number of problems. The main frame is one of the most important parts of a bicycle which defines the structural integrity thereof. The introduction of the joint thereat inevitably reduces the sturdiness of the main frame and the overall bicycle such that the performance of the bicycle in use would be severely hindered.

The present invention seeks to provide a foldable land vehicle and a folding mechanism to such a vehicle (e.g. a wheeled vehicle, a land vehicle) which addresses the above problems, or at least to provide a useful alternative to the public.

SUMMARY OF THE PRESENT INVENTION

According to a first aspect of the present invention, there is provided a foldable land vehicle comprising an elongate main frame generally defining a longitudinal axis running from a front end of the vehicle to a rear end of the vehicle, a front part including a front wheel, a rear part including a rear wheel, a first joint means for connecting the front part to the main frame and for folding the front part to a lateral side of the main frame, and a second joint means for connecting the rear part to the main frame and for folding the rear part to below the main frame. It is envisaged that with this design the vehicle when folded is substantially reduced in length. In particular, it may be reduced in a length roughly equal to the total of the diameter of the front wheel and the diameter of the rear wheel.

Preferably, the first joint means may comprise a hinge defining a generally vertical axis, the vertical axis being generally perpendicular to the longitudinal axis of the main frame or the ground level, wherein the front part is movable between (a) an extended position in which the vehicle is operable and (b) a folded position in which the vehicle is in a stowed configuration at the hinge whereby the overall length of the vehicle is substantially reduced by about the diameter of the front wheel.

Suitably, the main frame may comprise a support tube at which the hinge is located.

Advantageously, the first joint means may comprise means for relesably securing the front part (or the front part at a head tube thereof) of the vehicle in the extended position. In particular, the relesably securing means may be in the form of a cylindrical bracket at which the front part is secured in the extended position. Alternatively, other bracket-like or ring-like securing means may be used. The securing means may be adapted to grip and lock the head tube to the vehicle. In the stowed configuration, the front part including, for example the front wheel and a front fork of the front part, may be folded to the lateral side with the main frame such that the length of the vehicle is further reduced by about the diameter of the front wheel.

Preferably, the first joint means may be provided with an elongate cylindrical member (or a stud) and a plate member connecting the front part to the stud at which the front part is pivotable. More specifically, the plate member may be connected to a lower end of the stud by a universal-type joint.

In one embodiment, the vehicle may be adapted such that the rear part is movable between (a) an extended position in which the vehicle is operable and (b) a folded position in which the vehicle is in a stowed configuration about a transverse axis substantially perpendicular to the longitudinal axis of the main frame. In another embodiment, the vehicle may be adapted such that the rear part is swivelable from the extended position to the stowed position whereby the overall length of the vehicle is reduced by about the diameter of the rear wheel.

Suitably, the rear part may be swivelable between the extended position and the stowed position with an angle in the range of 100° to 180°. In particular, the angle may be substantially 140°. The ability to swivel in such a relatively large degree allows the rear wheel be folded below the main frame in a compact manner. Specifically, the ability of the rear part to swing in this relatively large degree from the rear of the vehicle behind a seat tube to the opposite side of the seat tube and below the main frame via an arc after traveling at least 100° ensures that the overall length of the vehicle is shortened by at least the diameter of the rear wheel.

Advantageously, the vehicle may comprise means for biasing the rear part to the extended position in use.

Preferably, the rear part may comprise at least one bar or one pair of bars connecting the rear wheel and the main frame.

Suitably, the second joint means may be provided with a pivot about which the rear part swivels.

Advantageously, the vehicle may comprise a first locking means for locking the rear part in place in the extended position such that the vehicle is operable. This arrangement prevents the vehicle from accidentally folding up in use in the extended position. The vehicle may also comprise a second locking means for locking the rear part in place in the stowed position when the vehicle is in a folded configuration. This arrangement prevents the vehicle from accidentally unfolding in its stowed or inoperable position.

Preferably, the vehicle may be free of any means for folding the main frame or the support tube of the vehicle. It is to be noted that the main frame or the support tube may be free of any means for folding the vehicle, such that the structural integrity of the mainframe or the vehicle would not be compromised.

The vehicle may be a foldable bicycle, a foldable motor bicycle or a foldable exercise bicycle. In particular, the vehicle may comprise a chainless transmission system or is free of any chain-type transmission mechanism. The use of a chainless transmission unit is preferable over a chain-type transmission unit because the folding or unfolding of the rear part would not be interfered by the chain.

According to a second aspect of the present invention, there is provided a foldable land vehicle comprising an elongate main frame generally defining a longitudinal axis, a front part including a front wheel, a rear part including a rear wheel, a first joint means for connecting a front part of the vehicle to the main frame, and a second joint means connecting a rear part of the vehicle to the main frame, wherein the first joint means comprises a hinge defining a generally vertical axis, the vertical axis being generally perpendicular to the longitudinal axis of the main frame or the ground level, and wherein the front part is adapted to be movable between (a) an extended position in which the vehicle is operable and (b) a folded position in which the vehicle is in a stowed configuration at the hinge about the vertical axis whereby the overall length of the vehicle is substantially reduced by about the diameter of the front wheel.

According to a third aspect of the present invention, there is provided a foldable land vehicle comprising an elongate main frame generally defining a longitudinal axis running from a front end of the vehicle to a rear end of the vehicle, a front part including a front wheel, a rear part including a rear wheel, a first joint means for connecting the front part to the main frame, a second joint means for connecting the rear part to said main frame and for folding the rear part to below the main frame, and a chainless transmission system or is free of any chain-type transmission mechanism, wherein the vehicle is adapted such that the rear part is movable between (a) an extended position in which the vehicle is operable and (b) a folded position in which the vehicle is in a stowed configuration about a transverse axis substantially perpendicular to the longitudinal axis of the main frame and the rear part is disposed below the main frame. The use of a chainless transmission unit is preferable over a chain-type transmission unit because the folding or unfolding of the rear part would not be interfered by the chain.

BRIEF DESCRIPTION OF THE DRAWINGS

Some embodiments of the present invention will now be described by way of example and with reference to the accompanying drawings, in which:—

FIG. 10a is side view of a partial front portion of the bicycle of FIG. 1, and FIGS. 10b to 10e are perspective views of different parts of the front portion of FIG. 10a, FIGS. 11 to 12 illustrate steps of folding a front part of the bicycle of FIG. 1, FIGS. 13 to 16 illustrate detailed steps of unfolding the rear part of the bicycle of FIG. 1, FIGS. 17 to 19 illustrate detailed steps of unfolding the front part of the bicycle of FIG. 1, FIGS. 20a to 20b show an alternative means for use in the bicycle of FIG. 1 for folding or unfolding the front part thereof.

DETAILED DESCRIPTION OF PREFERRED EMBDOIMENTS OF THE INVENTION

Figure 1:
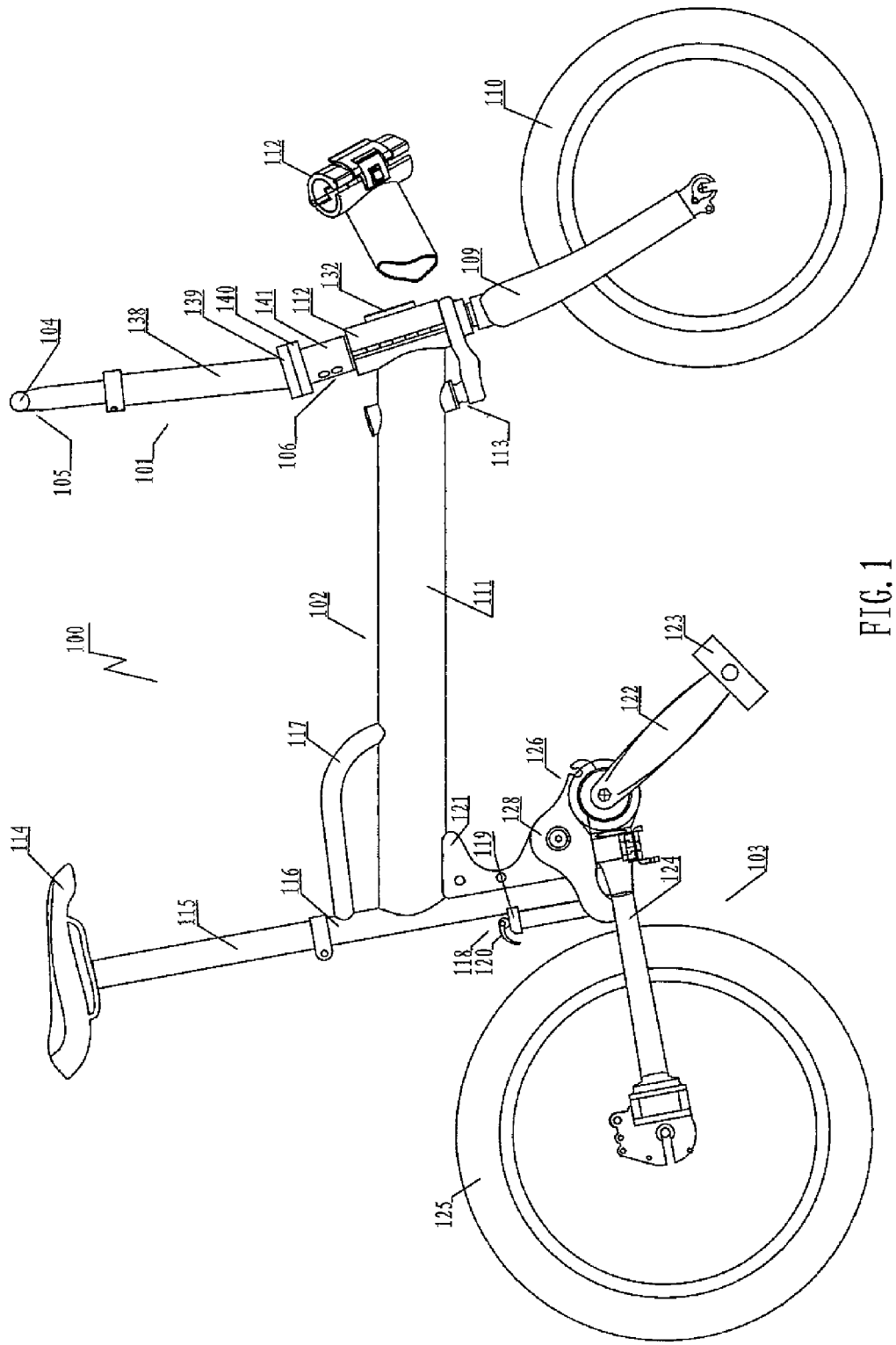
FIG. 1 is a schematic view of a bicycle according to a first embodiment of the invention.

The present invention is concerned with a land vehicle and a folding mechanism of the land vehicle. Two embodiments of the land vehicle in accordance with the present invention are shown in FIGS. 1 to 20b and FIGS. 21 to 40b, respectively.

Referring to FIGS. 1 to 20, a first embodiment of a land vehicle in the form of a bicycle, generally designated 100, is shown. The bicycle 100 comprises three main parts, namely a front part 101, an elongate main frame 102 and a rear part 103. As shown in at least FIGS. 1 to 3, the front part 101 comprises a handle bar 104 connected to a handlebar stem 105, a headset 106, a head tube 107 and a front fork 109 connected to a front wheel 110.

The main frame 102 (or the middle part of the bicycle 100) generally defines a longitudinal axis running from the front to the rear of the bicycle 100. The main frame 102 comprises a generally horizontally disposed support tube 111, a bracket member 112 connected and welded to the front end of the support tube 111 and serving to maintain the front part 101 in position in use, a hinge 113 provided at the front region of the support tube 111 and connected to the front part 101, an adjustable seat 114 removably rested on a seat post 115, a seat tube 116 within which the seat post 115 tightly fit, a handle 117 connected to the seat tube 116 and the support tube 111, and a locking means 118 fixedly connected to a lower rear part of the seat tube 116 for locking the rear part 103 to the main frame 102 in position. The locking means 118 comprises an elongate column provided with a hollow interior, opposite openings and a collar 119 at the upper end. An elongate cylindrical bar is loosely located in the column. The bar is slightly longer than the column thus with its ends extending from the opposite openings of the column. The upper end of the bar has an enlarged flange pivotably connected to a lever 120. A compression spring is provided between the enlarged flange of the bar and the collar 119 of the column. The lower end of the bar is provided with a T-shaped member 160, as shown in for example FIGS. 2 to 5. The seat tube 116 is also provided with an extension member 121 formed of a pair of walls, a right wall and a left wall, extended from the side opposite to the locking means 118.

Figure 6:
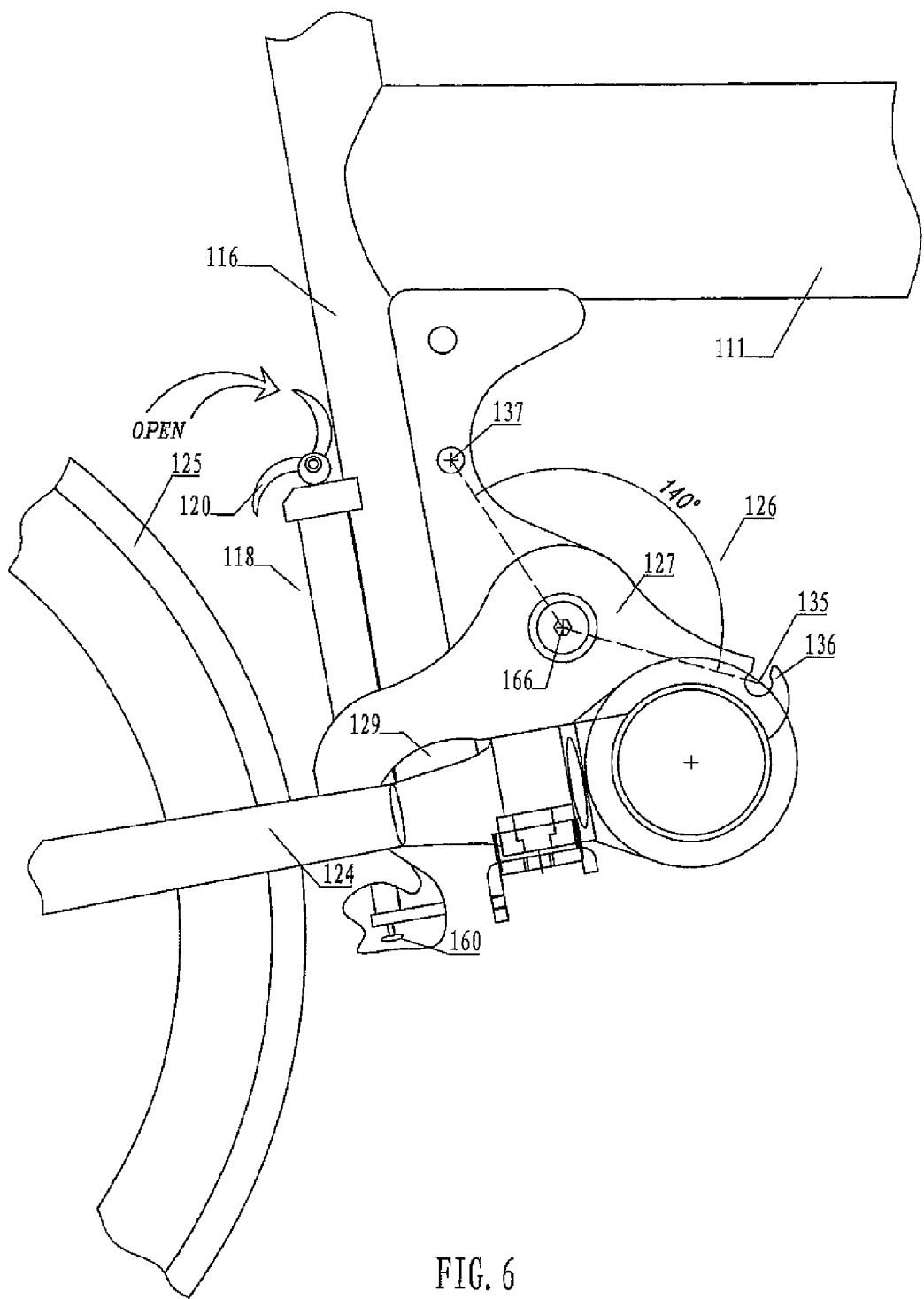
Figure 7:
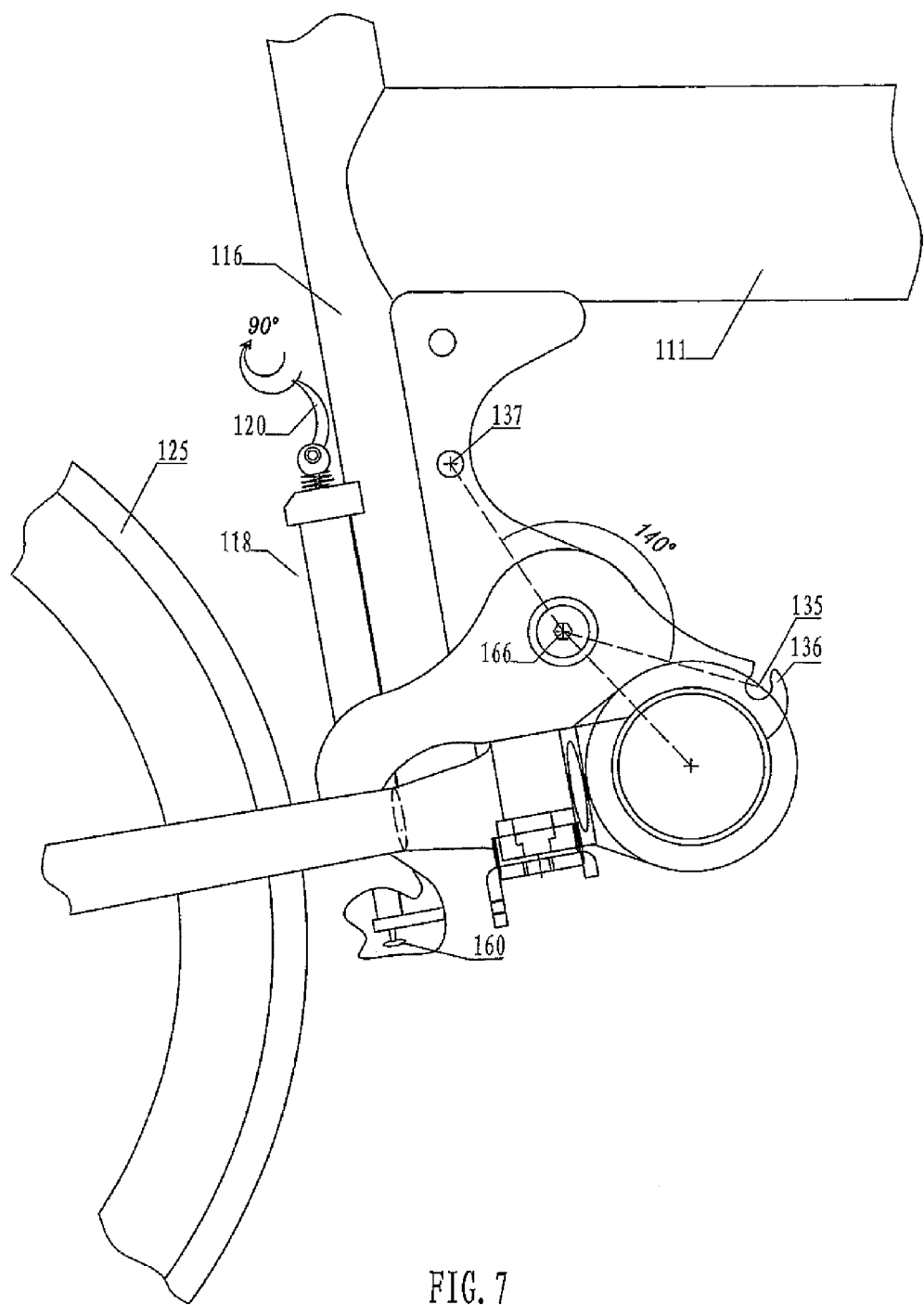

The rear part 103 comprises a pair of cranks 122 on opposite sides of the bicycle 100, a foldable peddle 123 extended from each of the cranks 122, and a pair of bars 124 one on each side of the bicycle 100 connecting to a rear wheel 125. The bar 124 on the left side (not shown) of the bicycle 100 is solid and has a smaller diameter. The bar 124 on the right side has however a larger diameter and is hollow in which a chainless transmission system resides. U.S. Pat. No. 5,967,537 discloses a chainless transmission mechanism which may be used in the bicycle 100. The transmission connects the cranks 122 of the bicycle 100 to the right side of the wheel 125. The front end of the two bars 124 sandwich and are welded to a seat member 126. As shown in FIG. 6, the seat member 126 generally comprises an elongate rectangular bottom plate with two walls 127 upwardly extending from the longer opposite sides of the plate, and the walls 127 serve as a bracket for sandwiching and pivotably attached to the extension member 121 at a pivot 166. The upwardly extending walls are generally symmetric in shape and size, and have a taller center region 128 at where the pivotal attachment to the extension member 121 resides. Each wall has an elongate opening or slit 129 in the lower end thereof via which where the bars 124 connects to the bottom plate, as shown in FIG. 6. The rear end of the bottom plate of the seat member 126 is provided with a relatively small elongate opening sized and shaped to just allow the end of the T-shaped member 160 to pass through. As shown in for example FIG. 1, the upper region of the walls 128 is provided with an opening through which a screw passes and at where the walls together with the seat member 126 and the rear part 103 are pivotably connected to the extension member 121.

Figure 2:
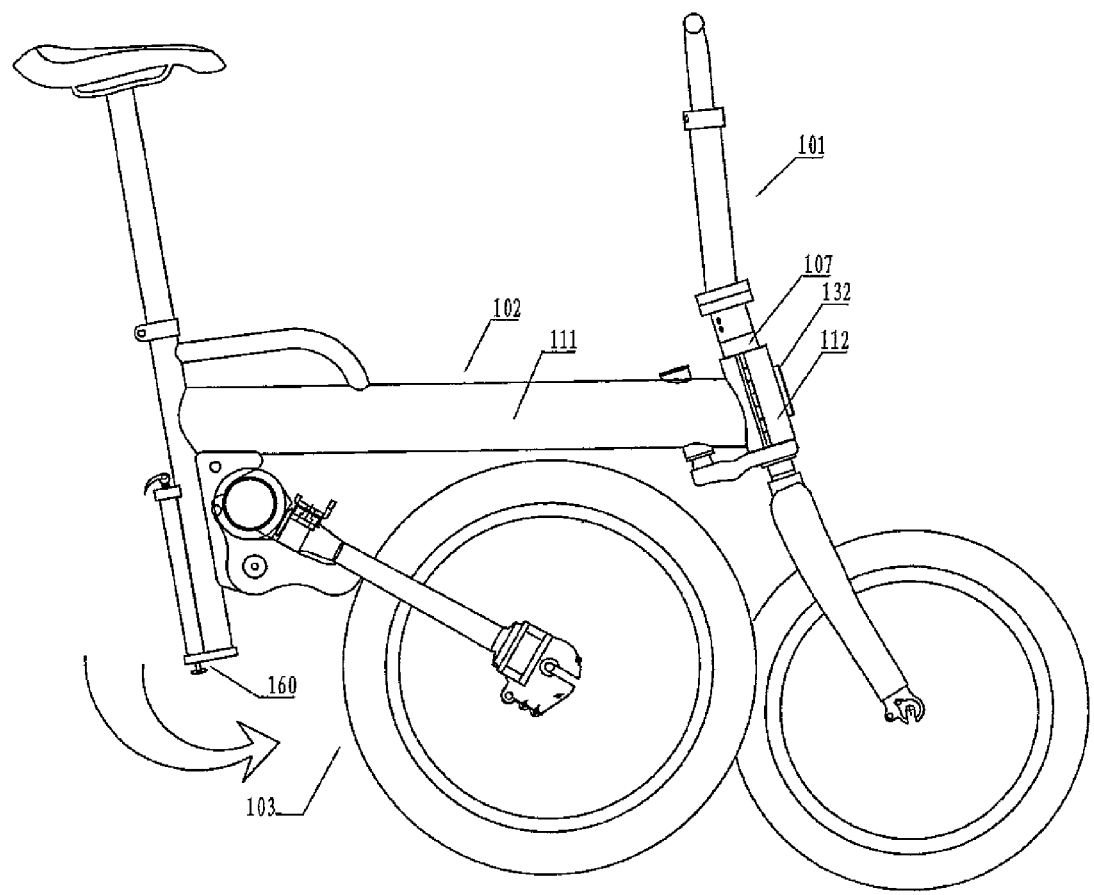
FIGS. 2 to 5 are a series of diagrams and provide an overview of folding the bicycle of FIG. 1, FIGS. 6 to 9 illustrate detailed steps of folding the rear part of the bicycle of FIG. 1.
Figure 12:
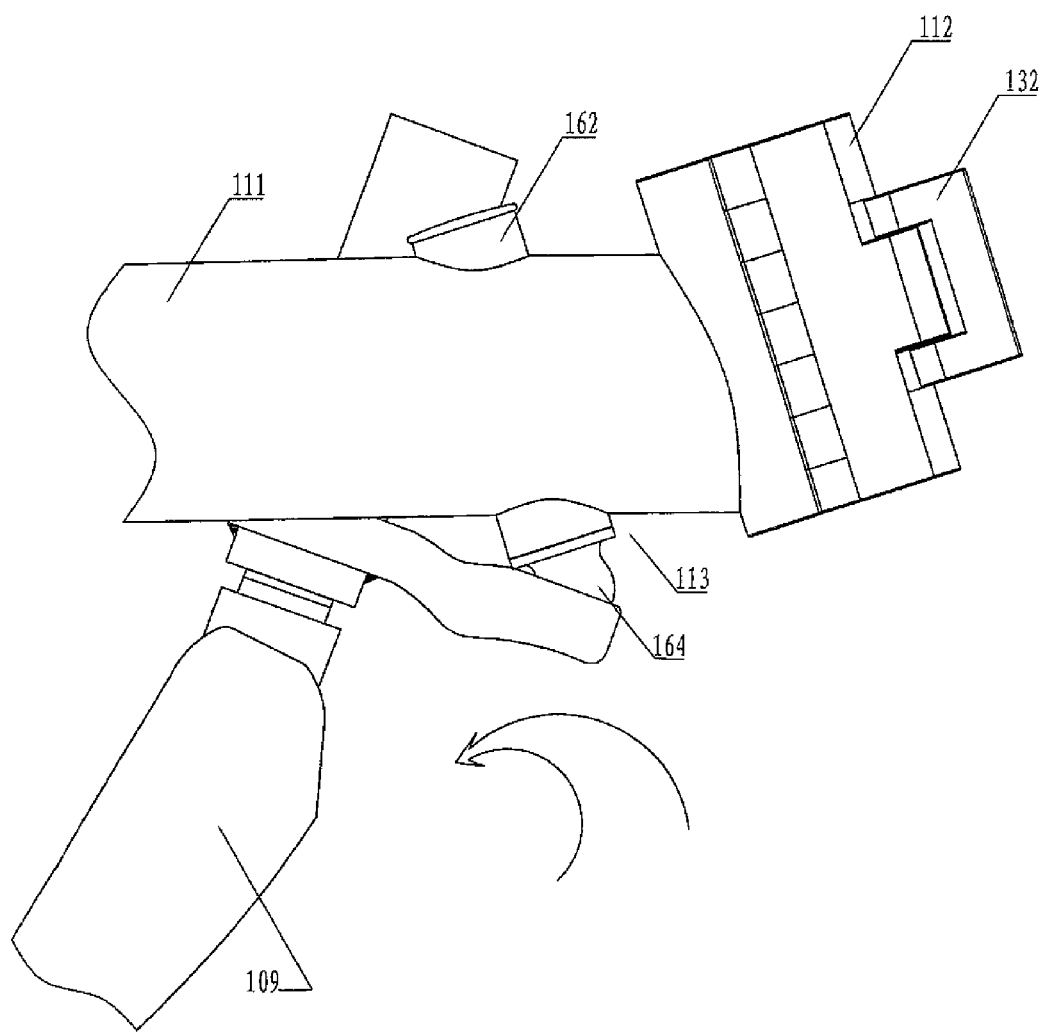
Figure 13:
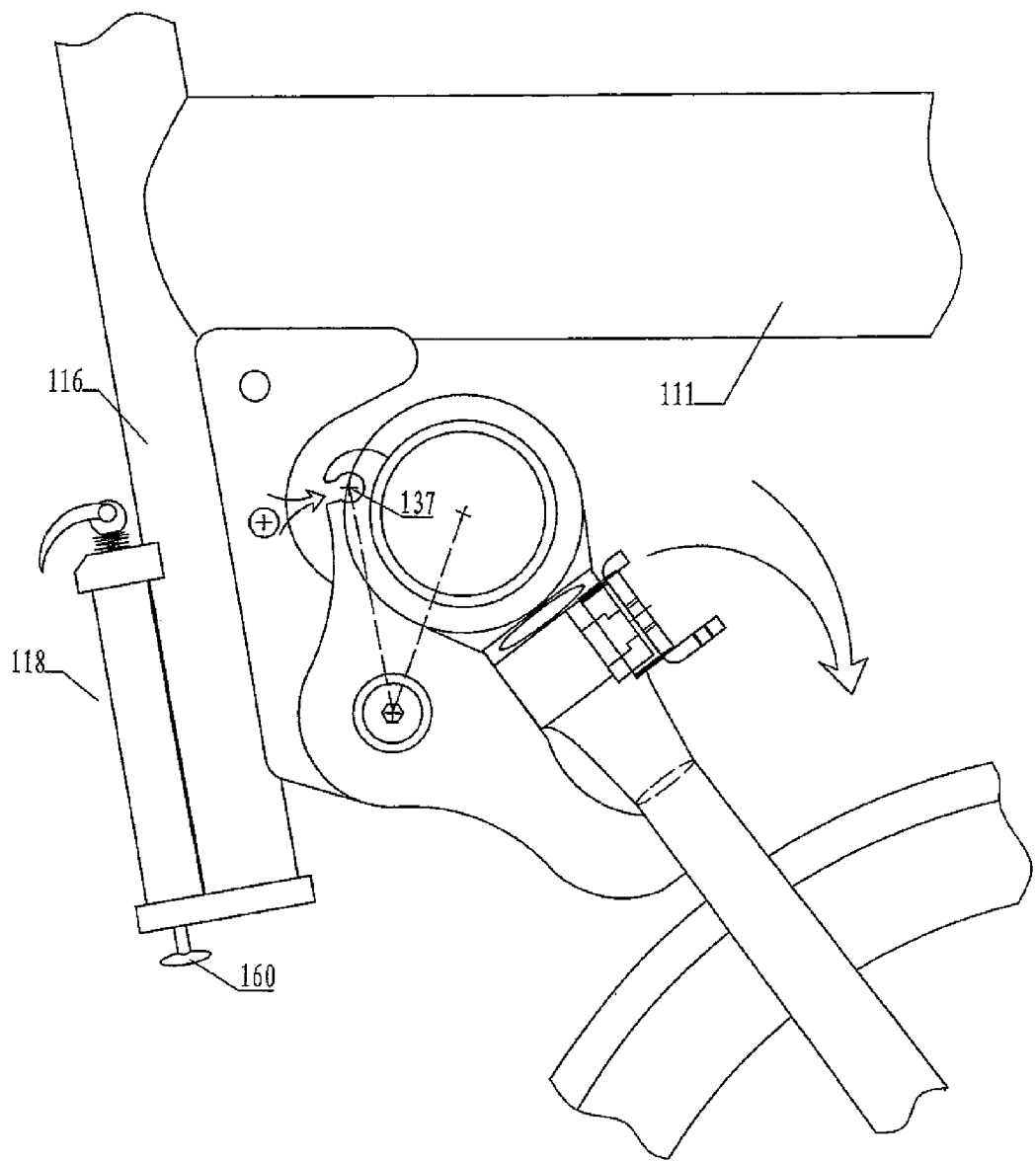
Figure 14:
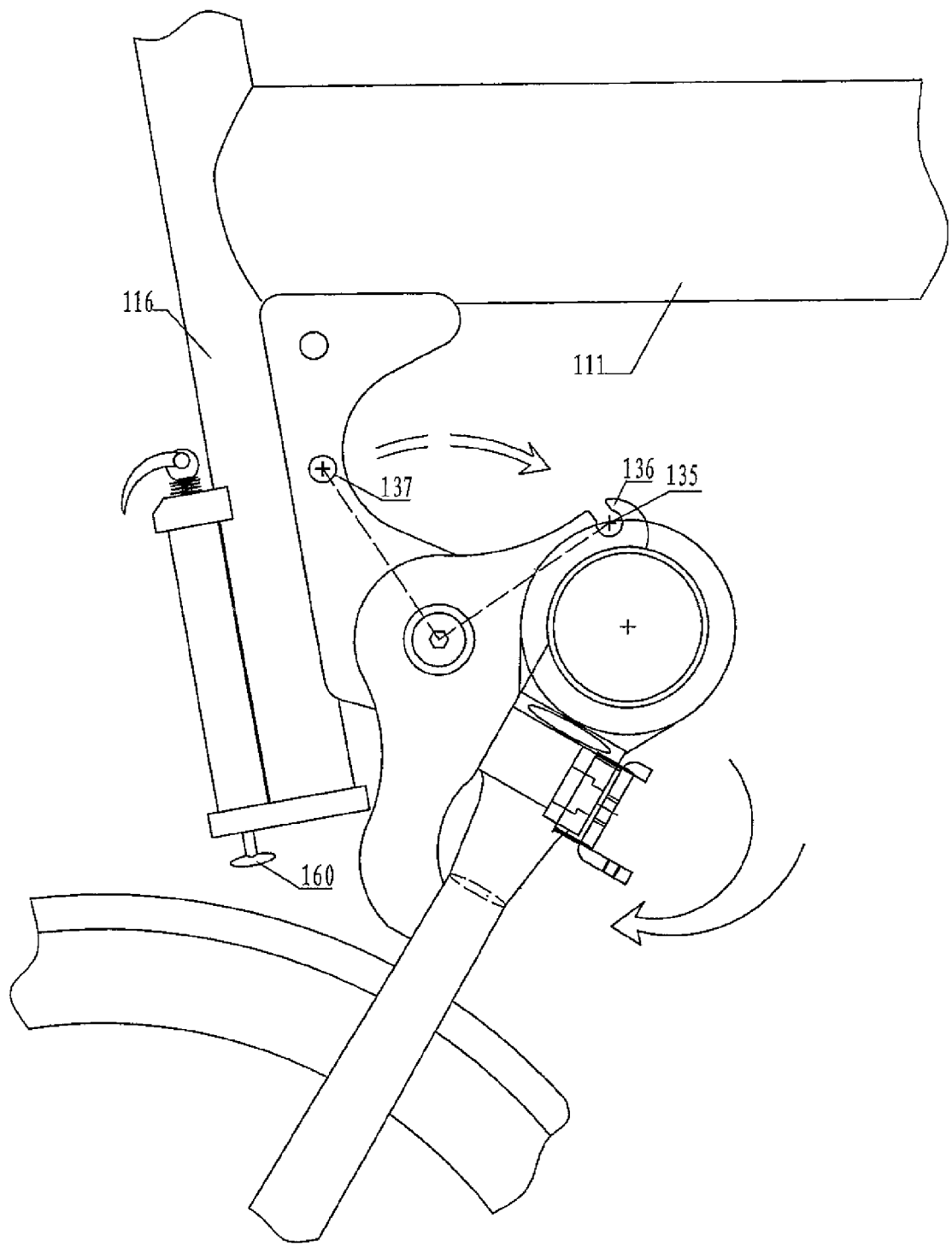
Figure 15:
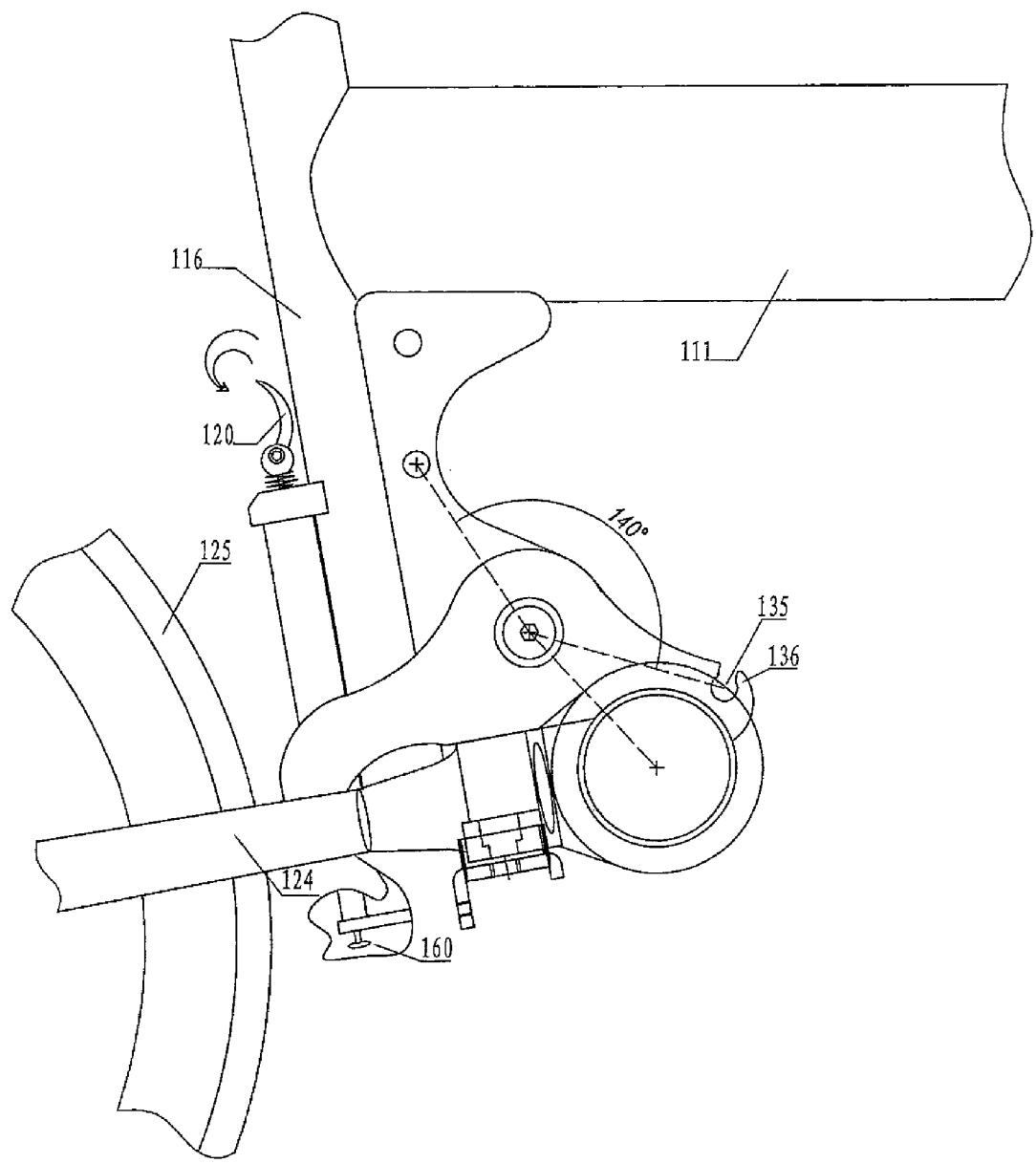
Figure 16:
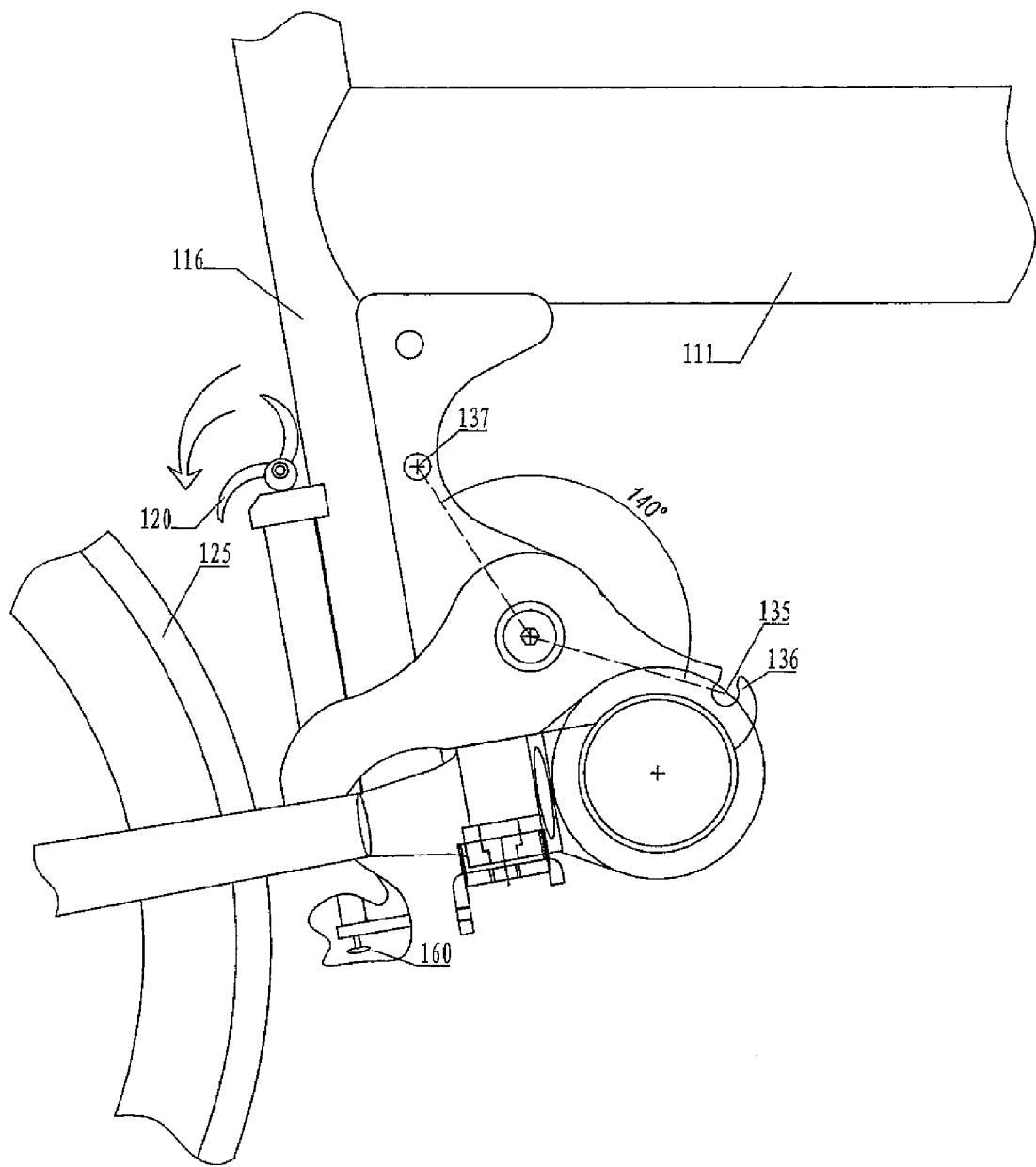
Figure 17:
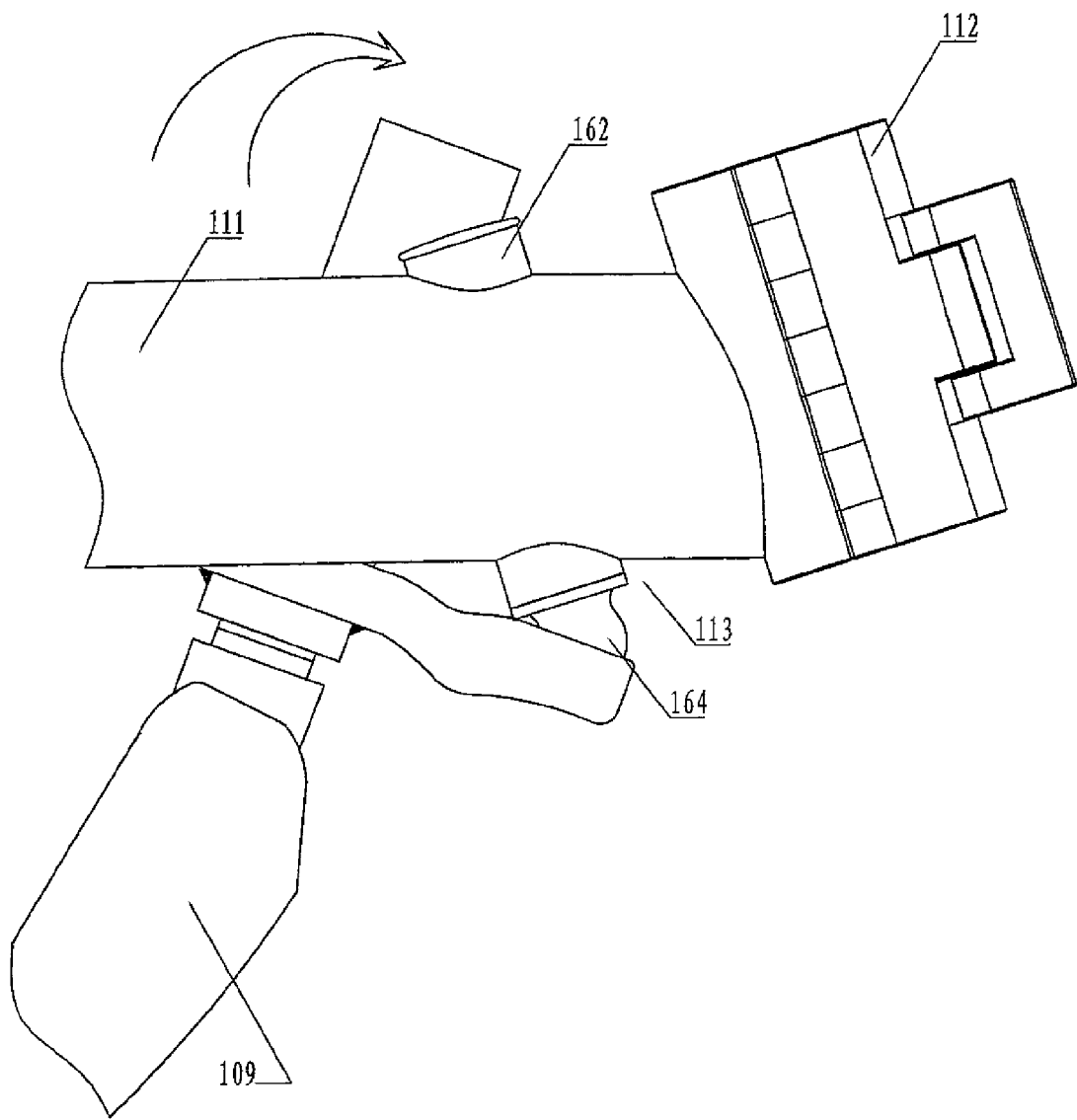
Figure 18:
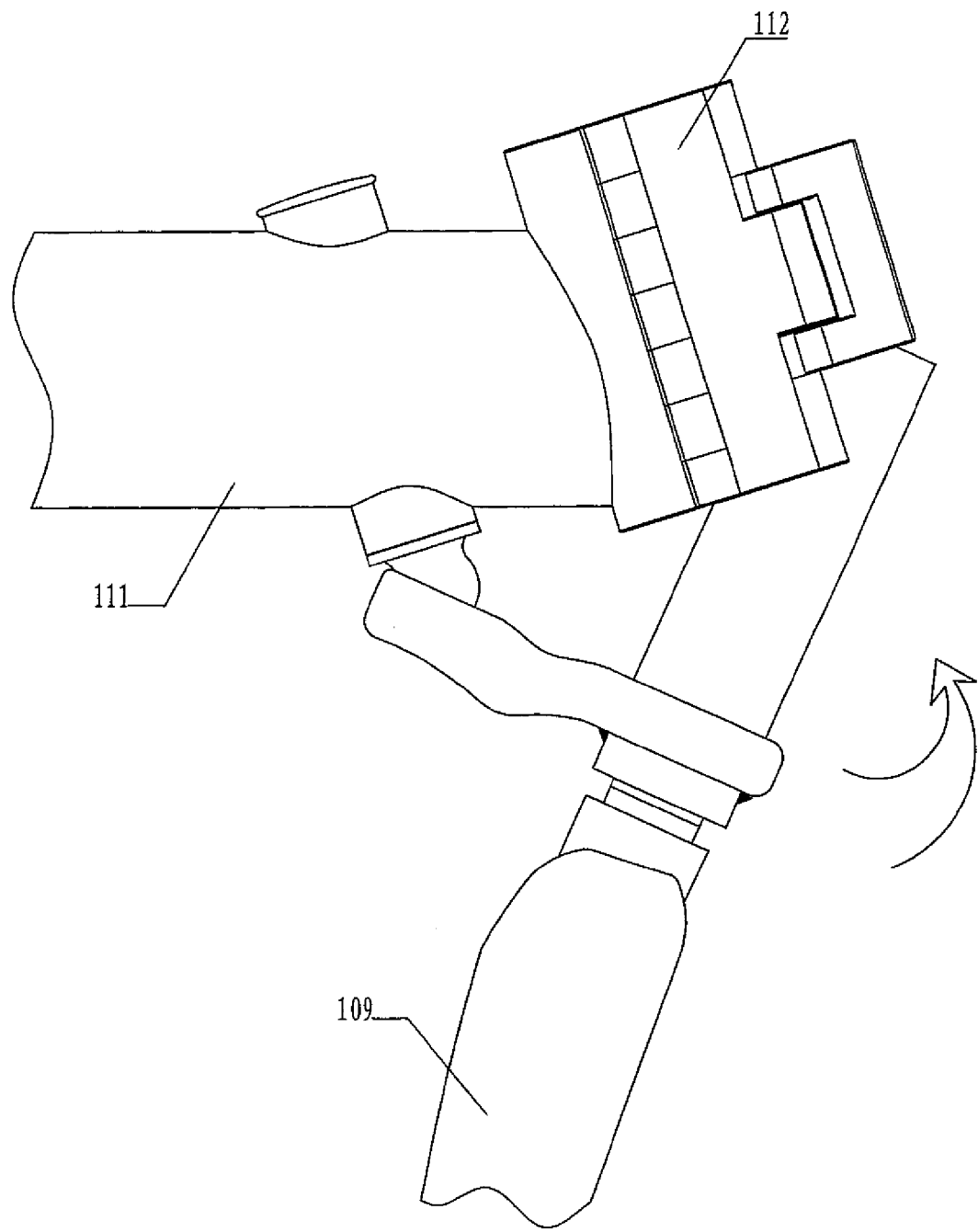
Figure 19:
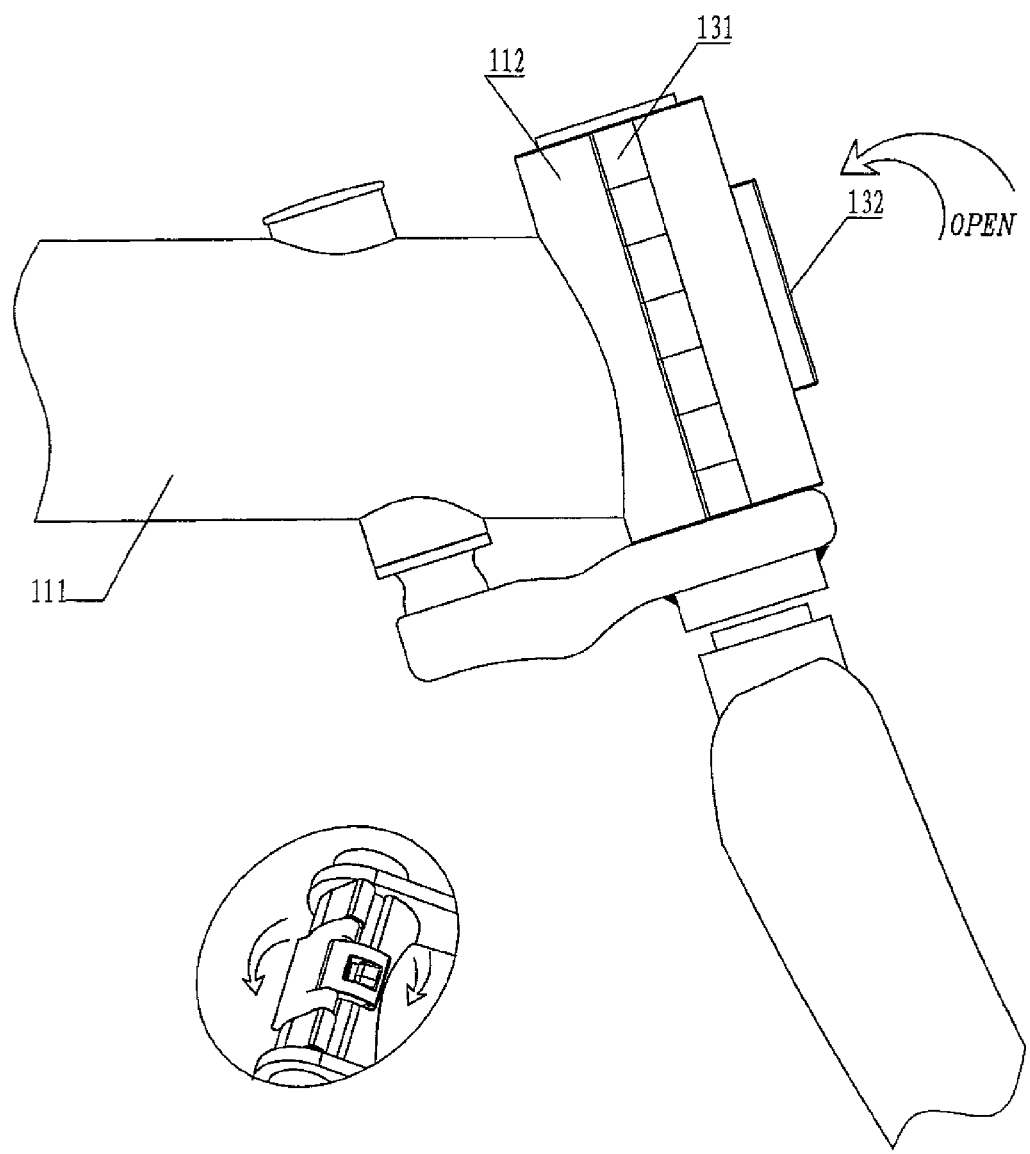

The bicycle 100 is provided with a folding mechanism including a number of joint (or folding) means connecting two parts together and allowing folding of the bicycle 100 at different locations such that in a folded or stowed configuration the bicycle 100 becomes relatively compact and may be placed in a relatively small suitcase. It is however to be noted that the present invention is not limited to provide all the joint means as discussed below. It is envisaged that the bicycle 100 in accordance with the present invention may be equipped with only one or some of joint means. The folding mechanism includes a first joint means adapted to fold the front part 101 to a lateral side of the bicycle 100, and this is shown in FIGS. 1 to 5, and in greater detail in FIGS. 10 to 12. In this embodiment, the front part 101 is foldable to the left side of the main frame 102 although it is envisaged that a vehicle in accordance with the present invention may have a front part foldable to a right side of the main frame thereof. The joint means includes the bracket member 112 (see for example FIGS. 2 and 3) for removably gripping, holding, and/or securing the head tube 107 in position. As shown in FIGS. 10a to 10e, the bracket member 112 has two elongate plates 130, each of which is bent such that it has a semi-circular cross section. The two plates 130 are connected at one side by a hinge 131 and at the other side with a latch 132 such that when assembled the two plates 130 form a tube-like structure in which the head tube 107 may be secured and held in place, as shown in FIGS. 1 and 2. As shown in for example FIGS. 2 and 10a, the first joint means also includes the hinge 113 having a cylindrical stud 162 with a substantially vertical axis. As illustrated in the figures, the vertical axis is actually slightly inclined but this slight inclination does not affect the working of the operation of the joint means. The hinge 113 also includes an elongate plate 135 which is connected at one end to the bottom of the stud 162 by a ball and socket-type or universal-type joint 164, and at the other end at the region above the front fork 109, thus connecting the front part 101 to the support tube 111. The stud 162 resides in a cylindrical column of the hinge 113 and generally defines the axis about which the front part 101 may fold. However, due to the nature of the joint 164, the front part 101 may juggle slightly when it is being folded to the side of the support tube 111. It is envisaged that when the latch 132 of the bracket member 112 is released (see FIGS. 10 to 11), the front part 101 is loosened from the bracket number 112 and may be swung to the side of the main frame 102 at the vertical axis, as shown in FIG. 12. In particular, it is also envisaged that when the bicycle 100 is to be folded to a stowed configuration, the latch 132 is released such that the bracket member 112 is disengaged releasing the head tube 107. Once the head tube 107 is released from the bracket 112, it together with the front part 101 is movable sideway and backward and can be swung to a side at the (vertical or longitudinal) axis of the hinge 113 until the first part 101 is located adjacent the support tube 111, as shown in FIGS. 1 to 9. The longitudinal axis is generally vertical to the ground level or the longitudinal axis of the support tube 111. In other words, the front part 101 connected to the plate 135 can pivot at the longitudinal axis defined by the stud 162 of the hinge 113. By folding the front part 101 of the bicycle 100 to the side of the main frame 102, the length of the bicycle 100 is shortened by approximately the diameter of the front wheel 110. FIGS. 17 to 19 illustrate steps of unfolding the front part 101, which essentially reverse the steps of folding the front part 101 as in FIGS. 10 to 12.

Figure 8:
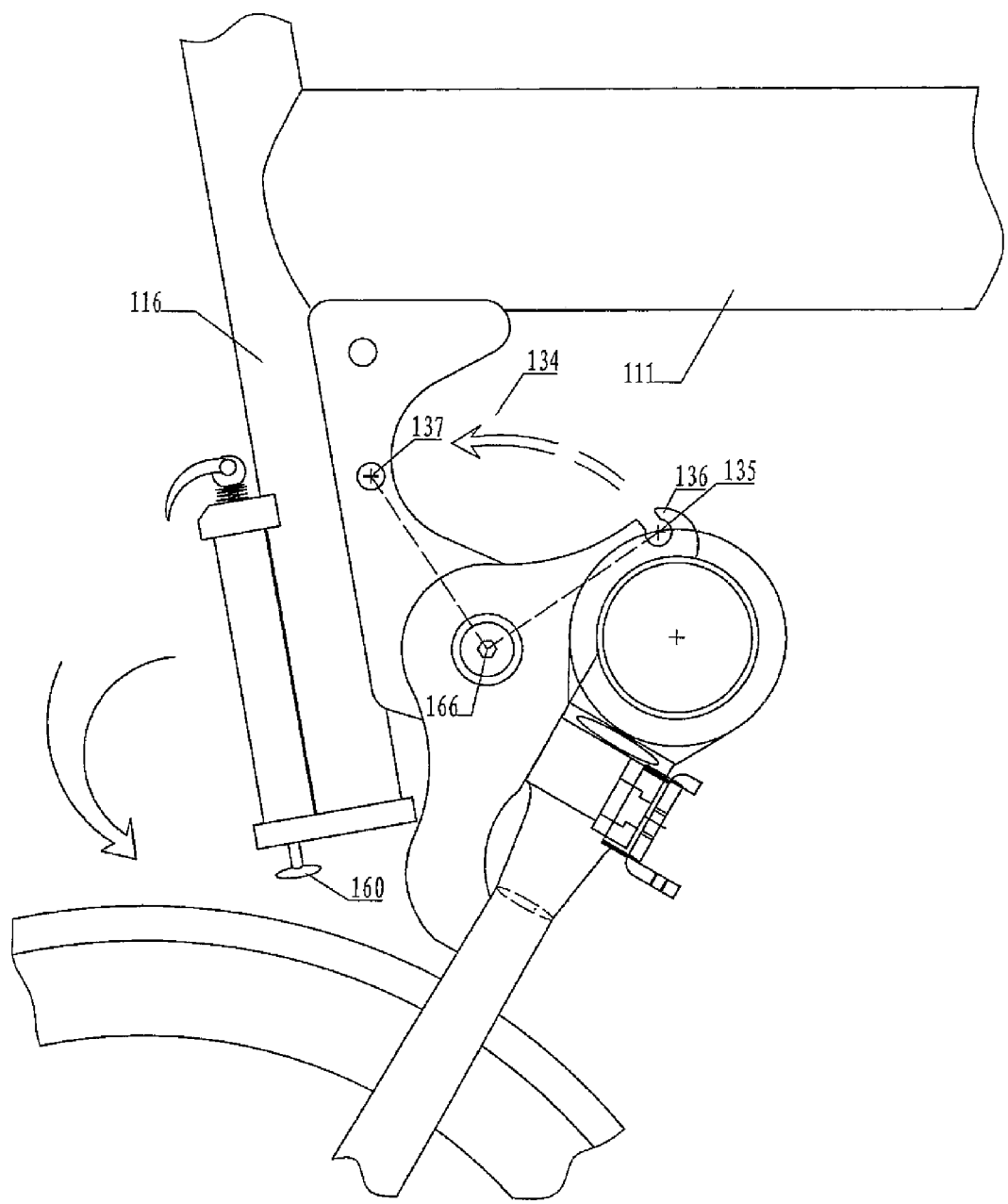
Figure 9:
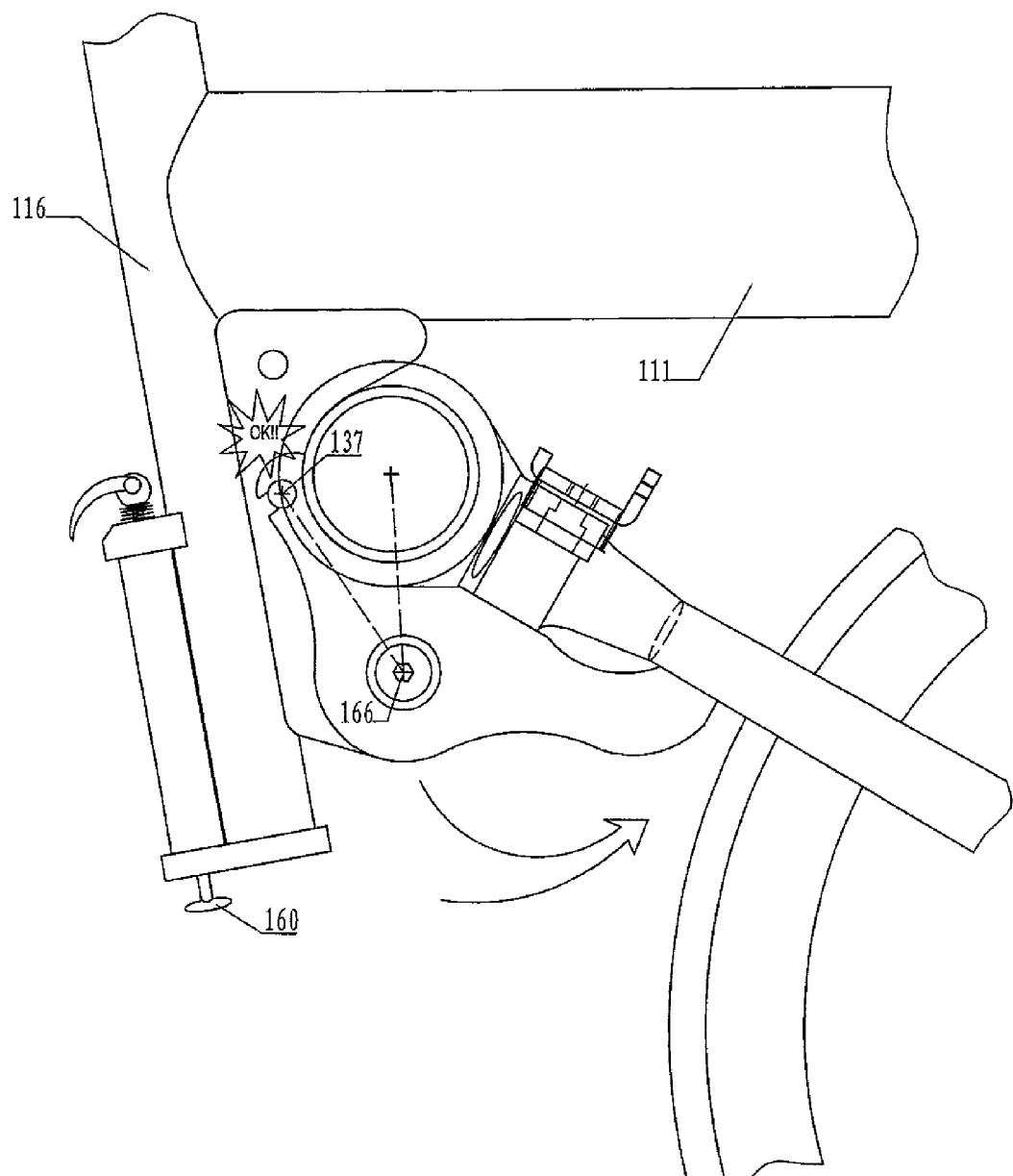
Figure 11:
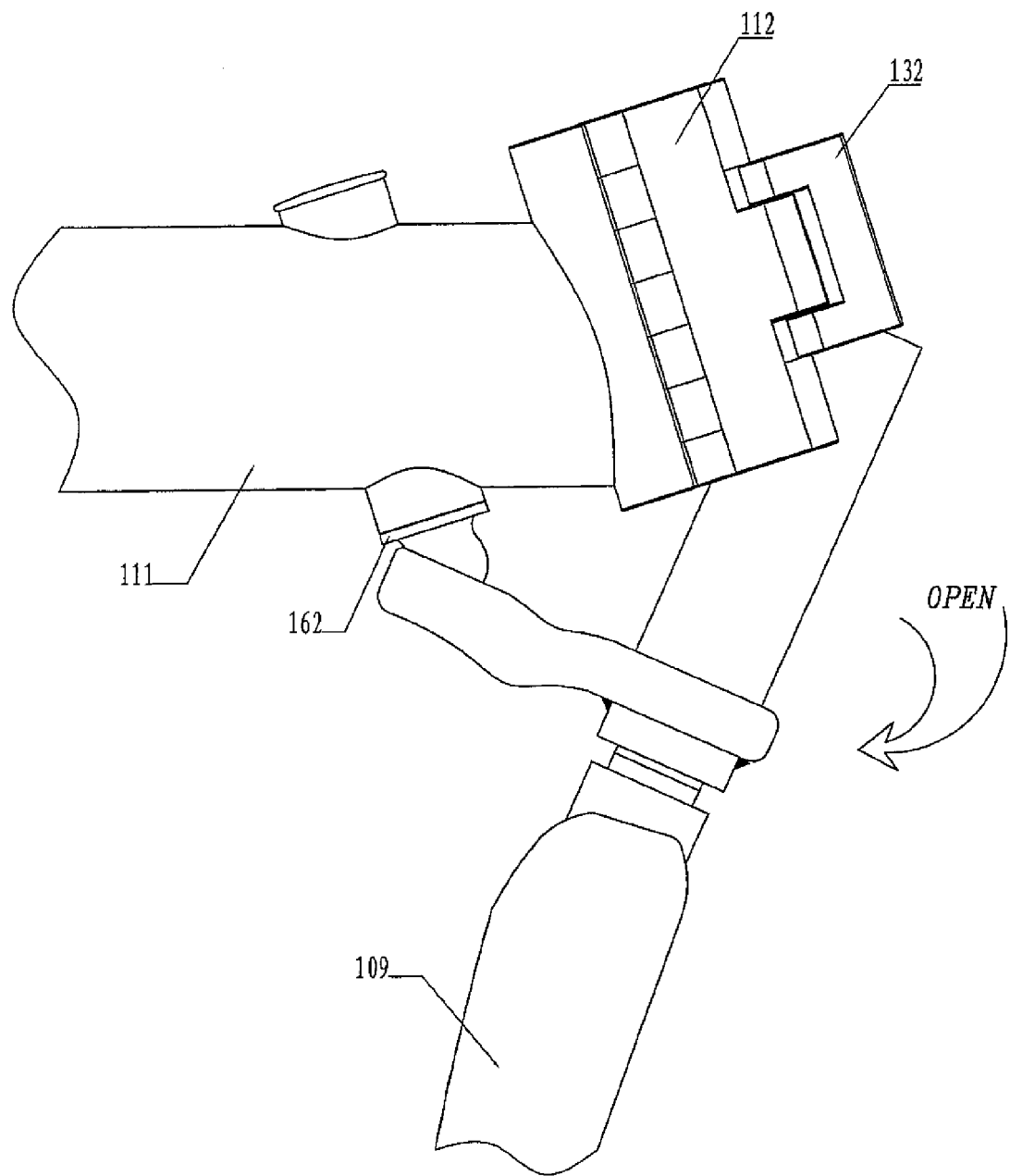

The folding mechanism includes a second joint means adapted to allow the rear part 103 of the bicycle 100 to move from an unfolded or extended position via an arc to below the support tube 111. FIG. 2 illustrates that the rear part 103 including the rear wheel 125 folded with and disposed below (and not just adjacent) the support tube 111 of the main frame 102. The initial downwardly folding of the rear part 103 from its extended position via an arc to eventually below the support tube 111, together with the sideway folding of the front part 101, reduces the length of the bicycle 100 to about half of its original length in the unfolded configuration (see FIGS. 1 and 3). FIGS. 2 and 6 to 9 illustrate the folding of the rear part 103 in greater detail. Before the rear part 103 is to be folded with the main frame 102, it is to be noted that it is securely locked with the seat tube 116 by the locking means 118. This is achieved when the bottom of the seat tube 116 sits on the seat member 126 of the rear part 103 by gravity and the T-shaped member 160 of the locking means 118 connected to the seat tube 116 passes through the opening of the seat member 126 and presses against the underside of the seat member adjacent the opening due the biasing action of the spring in the locking means 118. Thus, as a first step in the folding process, the locking means 118 is to be unlocked in that the lever 121 of the locking means 118 is lifted and turned at 90° such that the T-shaped member 160 is turned from a locked position in which it engages and presses against the seat member 126 to an unlocked position in which it aligns with the elongate opening. Once the T-shaped member 160 is aligned with the opening, the bar connected thereto is lifted by biasing action of the spring thus disengaging the T-shaped member 160 from the seat member 126. As a result, the rear part 103 becomes unlocked with the seat member 126 and the main frame 102. The main frame 102 may then be lifted up. Due to the weight of the rear part 103 and the disengagement with the locking means 118, the rear part 103 moves downwardly in relation to the main frame 102. The rear part 103 is then to be swung towards just below the support tube 111. As shown in FIG. 6, due to the presence of the pivotal connection between the walls of the seat member 126 and the extension member 121, it is envisaged that the rear part 103 swivels from the extended position to a folded position about a transverse axis (extending from the pivot 166) which is substantially perpendicular to the longitudinal axis of the bicycle 100. In order to secure the rear part 103 in the folded position, a further locking means 134 is provided, as shown in FIGS. 8 and 9. The locking means 134 (see FIG. 8) comprises a generally circular recess 135 with a narrower neck 136 at the front end of the right wall of the seat member 126, and a pin 137 disposed across the extension member 121 from the left to the right side thereof. The locking means 134 is provided with a compression spring arranged between the walls of the extension member 121 and the pin 137 is biased by the spring to the position towards the right such that an end thereof protrudes from the right wall of the extension member 121. The left side of the pin 137 is provided with a ring for pulling the pin 137 away from its right position. The locking means 134 is arranged such that when the rear part 103 is about to be fully folded, the neck 136 of the recess 135 engages with the pin 137 and pushes it to the left. As the rear part 103 is fully folded with the main frame 102, the pin 137 is biased to its right position in which the right wall of the seat member 126 is locked by the pin 137 to the extension member 121 thus securing the rear part 103 in the folded position. FIGS. 13 to 16 illustrate the unfolding of the rear part 103 to its extended position. To unfold the rear part 103, the pin 137 is first moved to the left by pulling the ring connected thereto. The rear part 103 is then unlocked from the folded position. The rear part 103 is then moved by swinging it to the unfolded position via the same arc at the same pivotal connection between the seat member 126 and the extension member 121. It is envisaged that the rear part 103 can then swivel from the folded position to the unfolded about the transverse axis. In order words, the folding or unfolding of the rear part 103 with the main frame 102 hinges on the pivotal connection between the seat member 126 and the extension member 121. In order to secure the rear part 103 in its unfolded position, the bar of the locking means 118 is first downwardly pushed at the lever 120 connected thereto so that the T-shaped member 160 moves pass the opening. The lever 120 together with the T-shaped member 160 is then turned at 90° such that the T-shaped member 160 is disposed perpendicular to the elongate opening and presses against the bottom side of the seat member 126.

Figure 3:
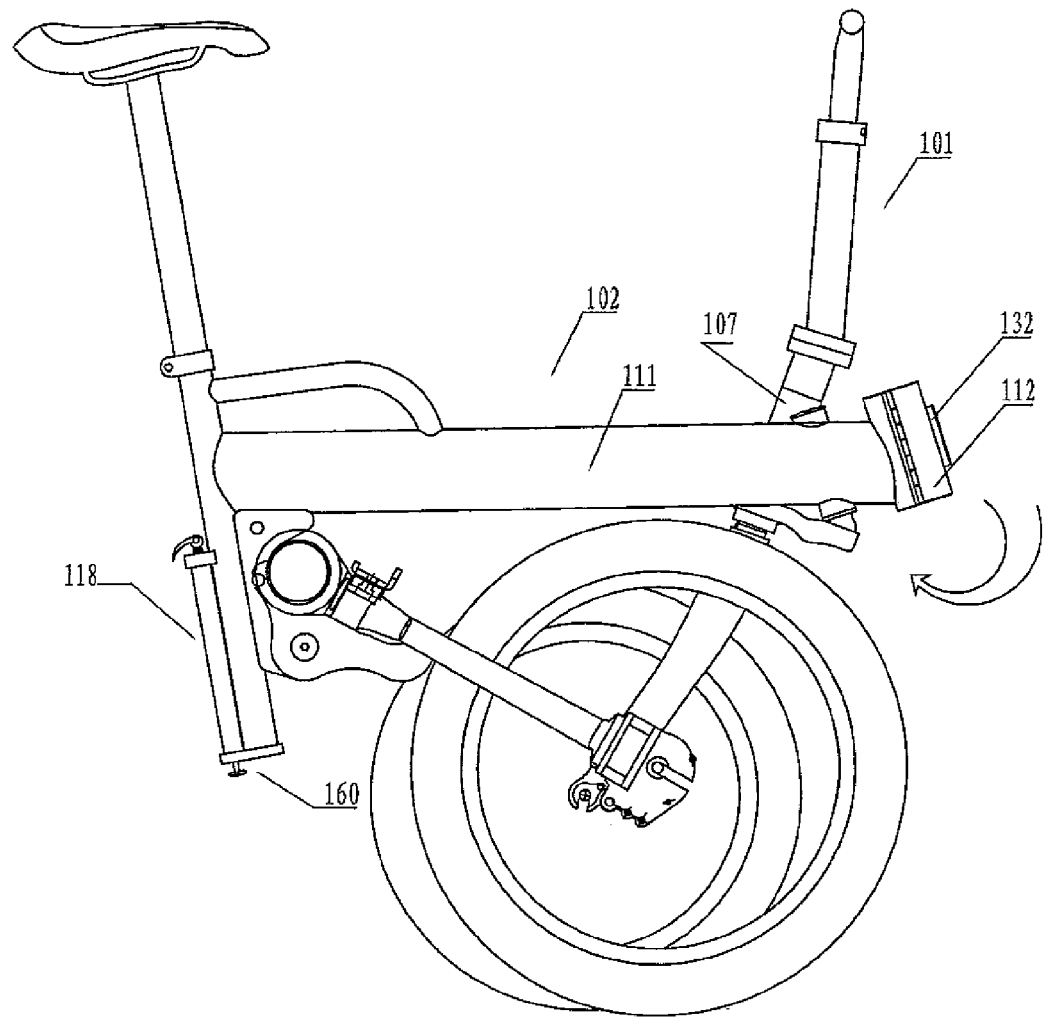
Figure 4:
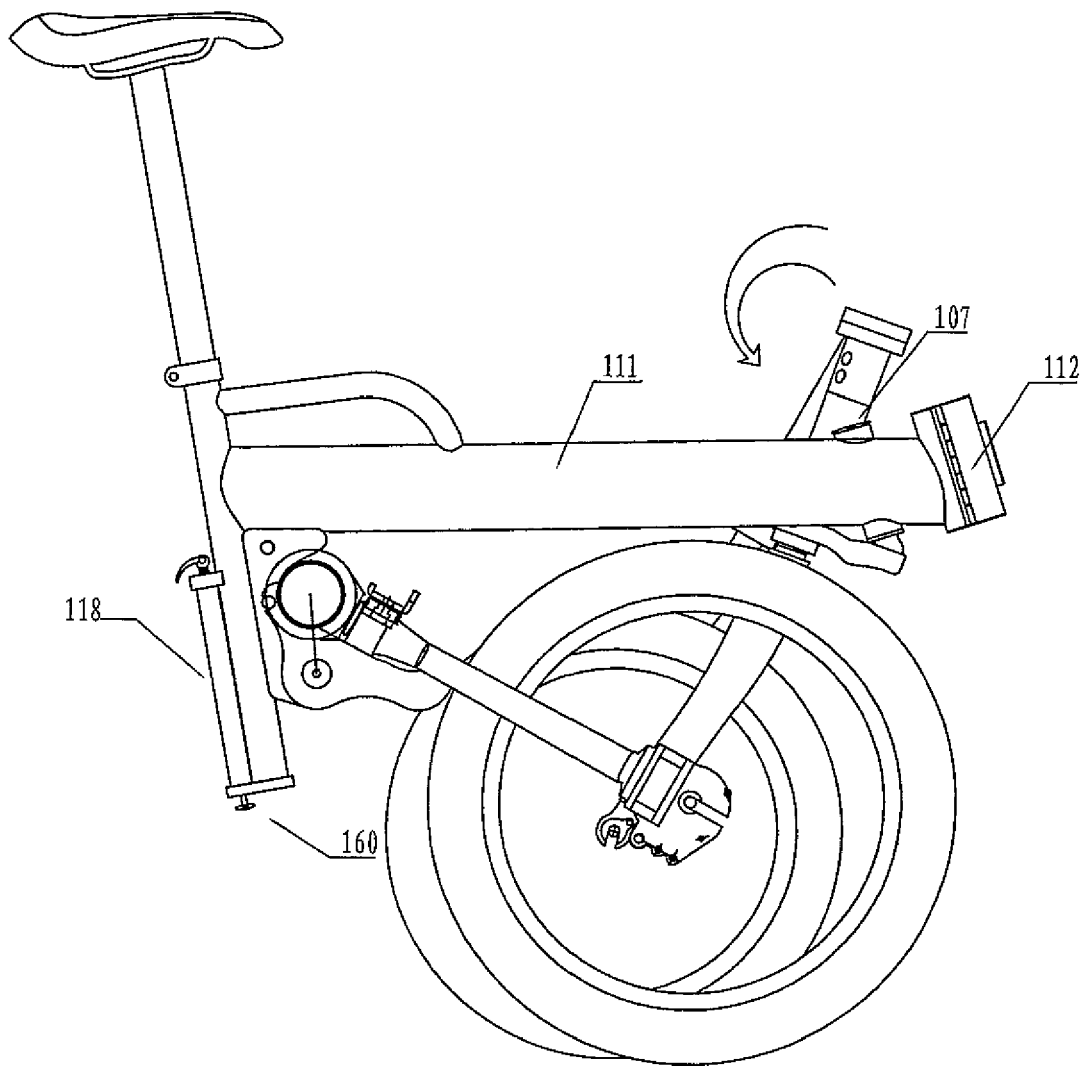
Figure 5:
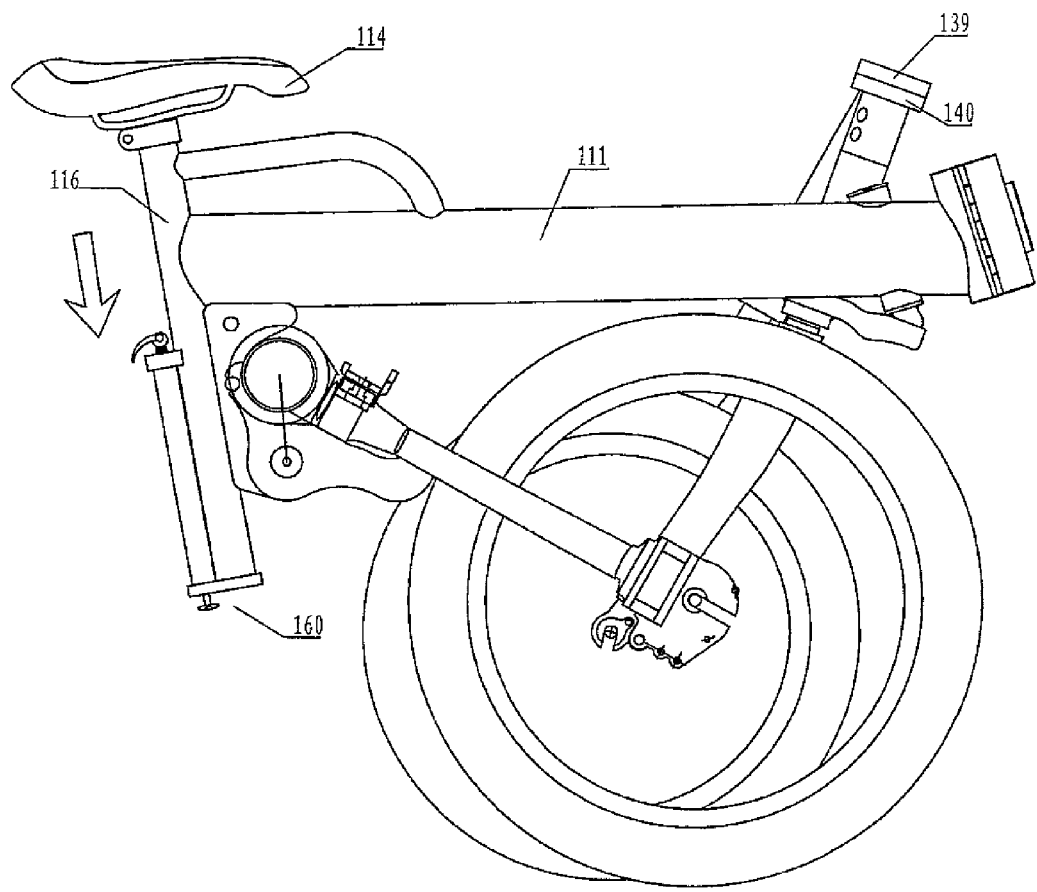

The folding mechanism also includes a third joint means for reducing the height of the bicycle 100. The third joint means is adapted to the reduce height of the front part 101. The headset 105 of the front part 101 is provided with a column substantially and vertically disposed when the bicycle 100 is in the unfolded or operable configuration. As shown in FIGS. 1 to 3, the column includes an upper part 138 which is welded to an upper rectangular plate 139 at its lower end, and a lower part 141 which is welded to a lower rectangular plate 140 at its upper end. The front fork 109 is extended from the lower part 141 of the column which is connected and welded to the plate 140. The upper and lower plates 139, 140 are connected together at one side thereof by a hinge and removably secured together by a bolt at the other side. When the headset 105 is to be folded down to the front wheel 110, the bolt is released and the upper part 138 of the column is then downwardly folded to the side of the lower part of the column, as shown in FIGS. 4 to 5.

The folding mechanism includes a fourth joint means for reducing the height of the bicycle is to lower the seat 114. The top of the seat tube 115 is provided with a latch for removably securing the seat in a predetermined position. On releasing the latch, the seat post 115 can be fully received in the seat tube 116 such that the seat 114 connected to the seat post 115 is lower to right above the seat tube 116. Alternatively, the seat 114 together with the seat post 115 may be firstly removed from the seat tube 116, and the seat post 115 may be re-fitted to seat tube 116 from a lower opening thereof.

Figure 20A:
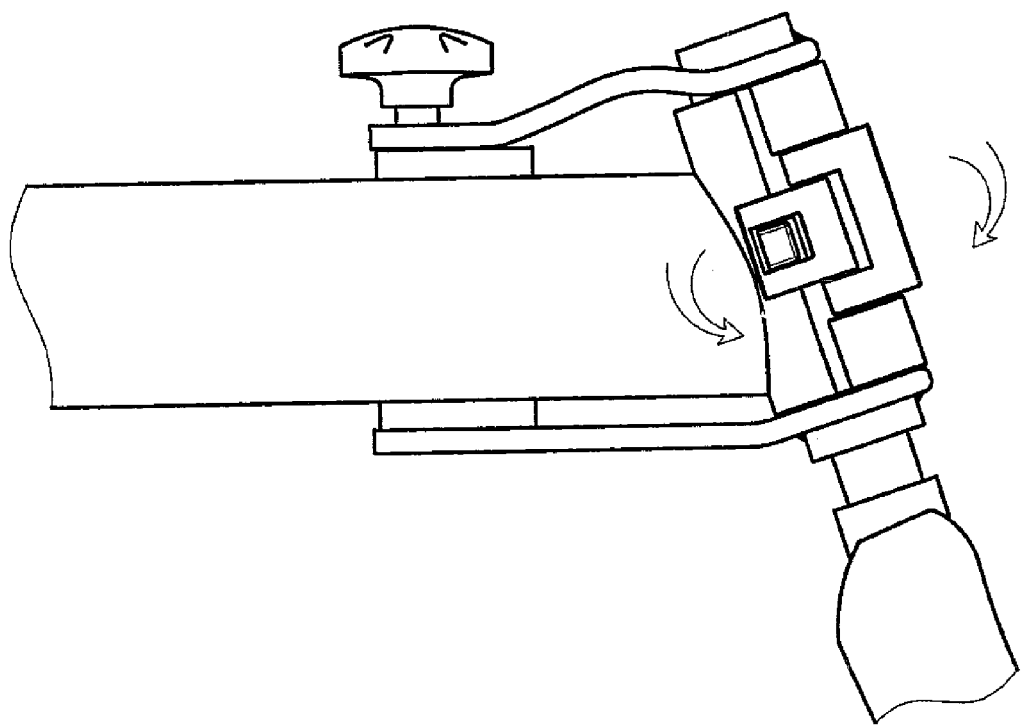
Figure 20B:
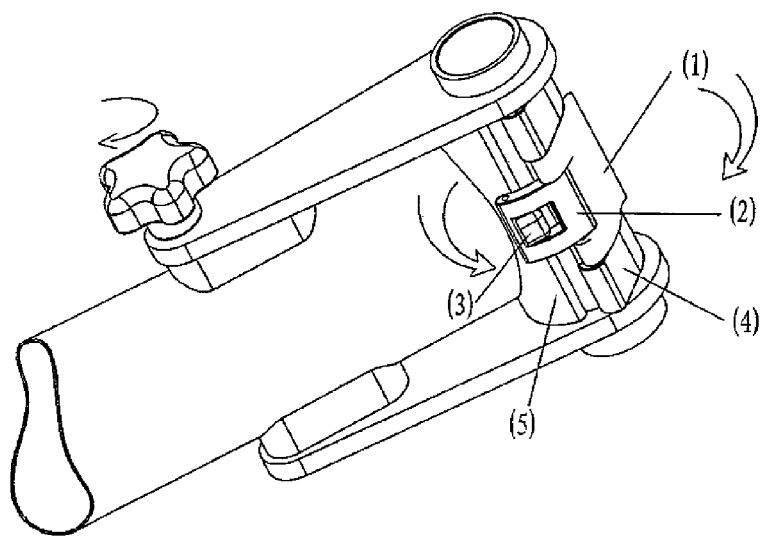
Figure 21:
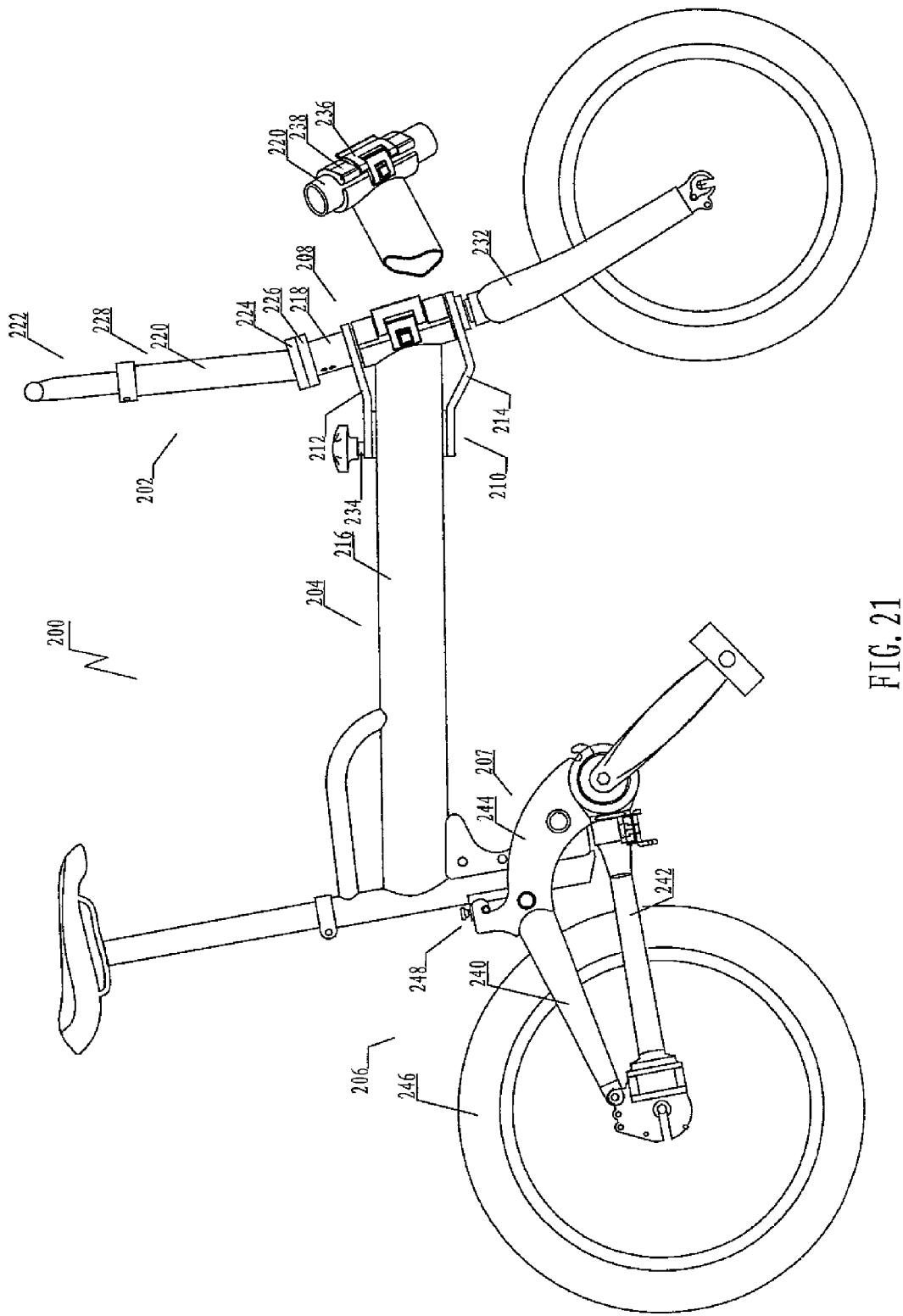
FIG. 21 is a schematic view of a bicycle according to a second embodiment of the invention.
Figure 22A:
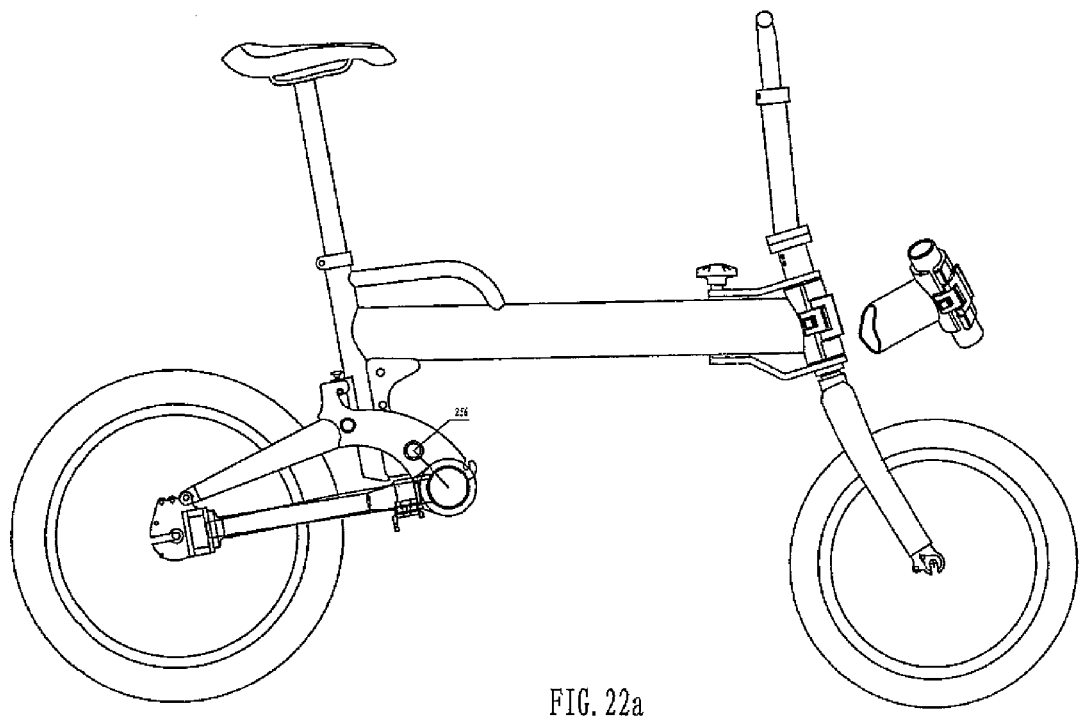
FIGS. 22a & 22b and 23 to 26 are a serious of diagrams and provide an overview of folding the bicycle of FIG. 21, FIGS. 27 to 30 illustrate detailed steps of folding the rear part of the bicycle of FIG. 21.
Figure 22B:
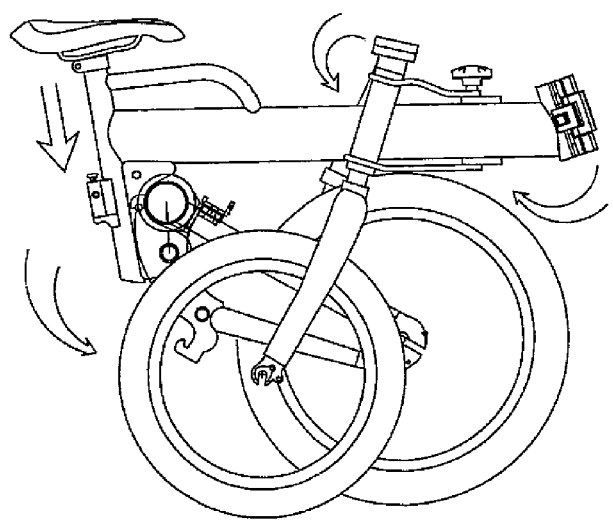
Figure 23:
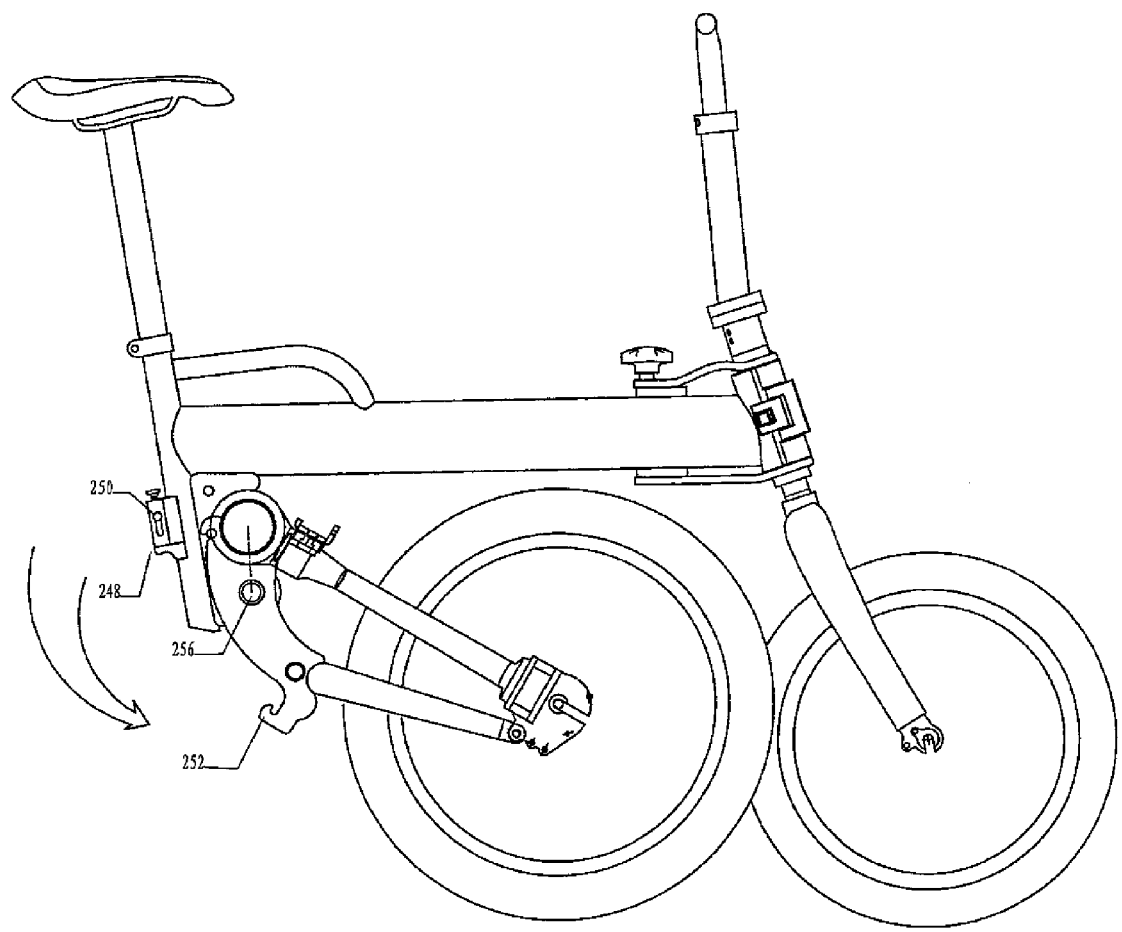
Figure 24:
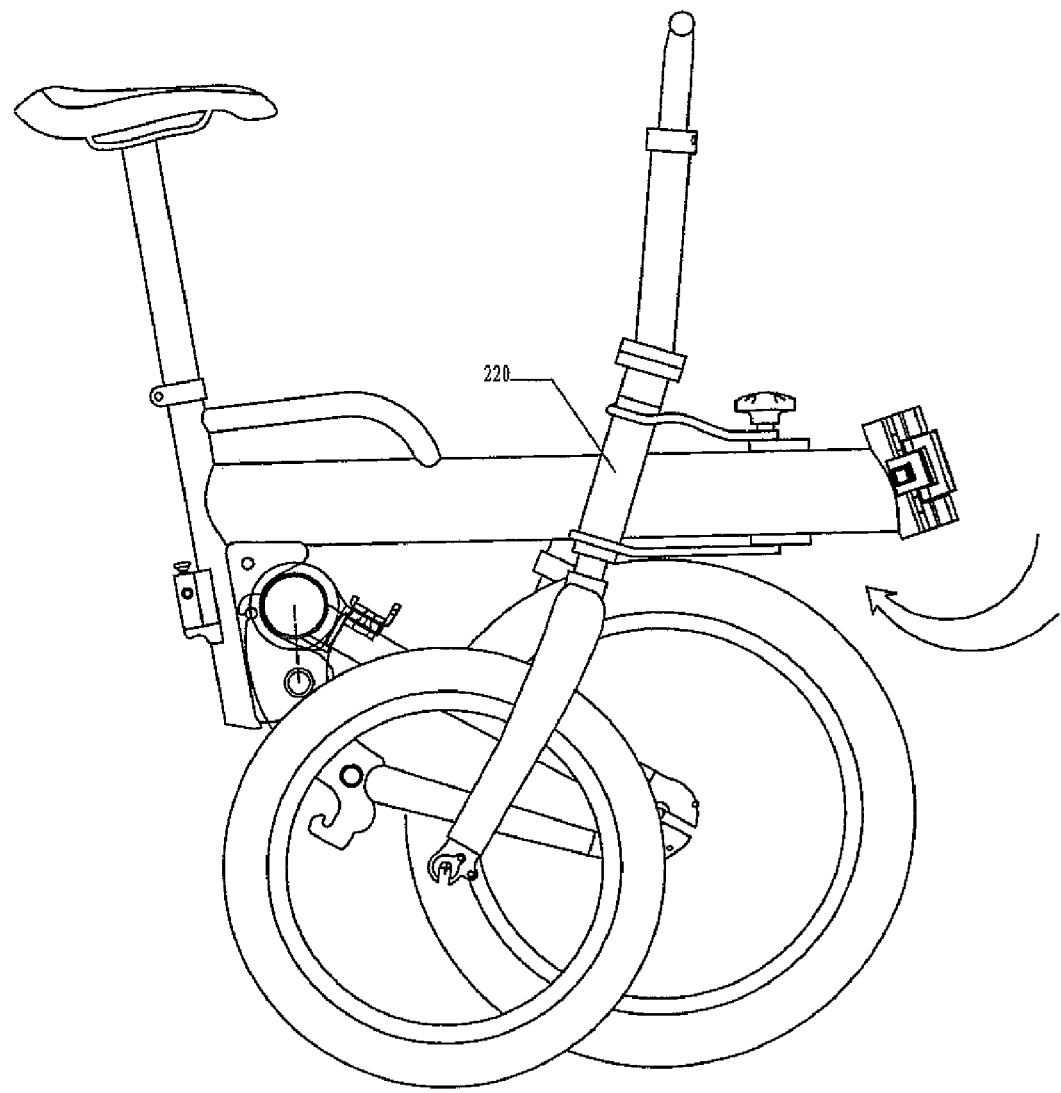
Figure 25:
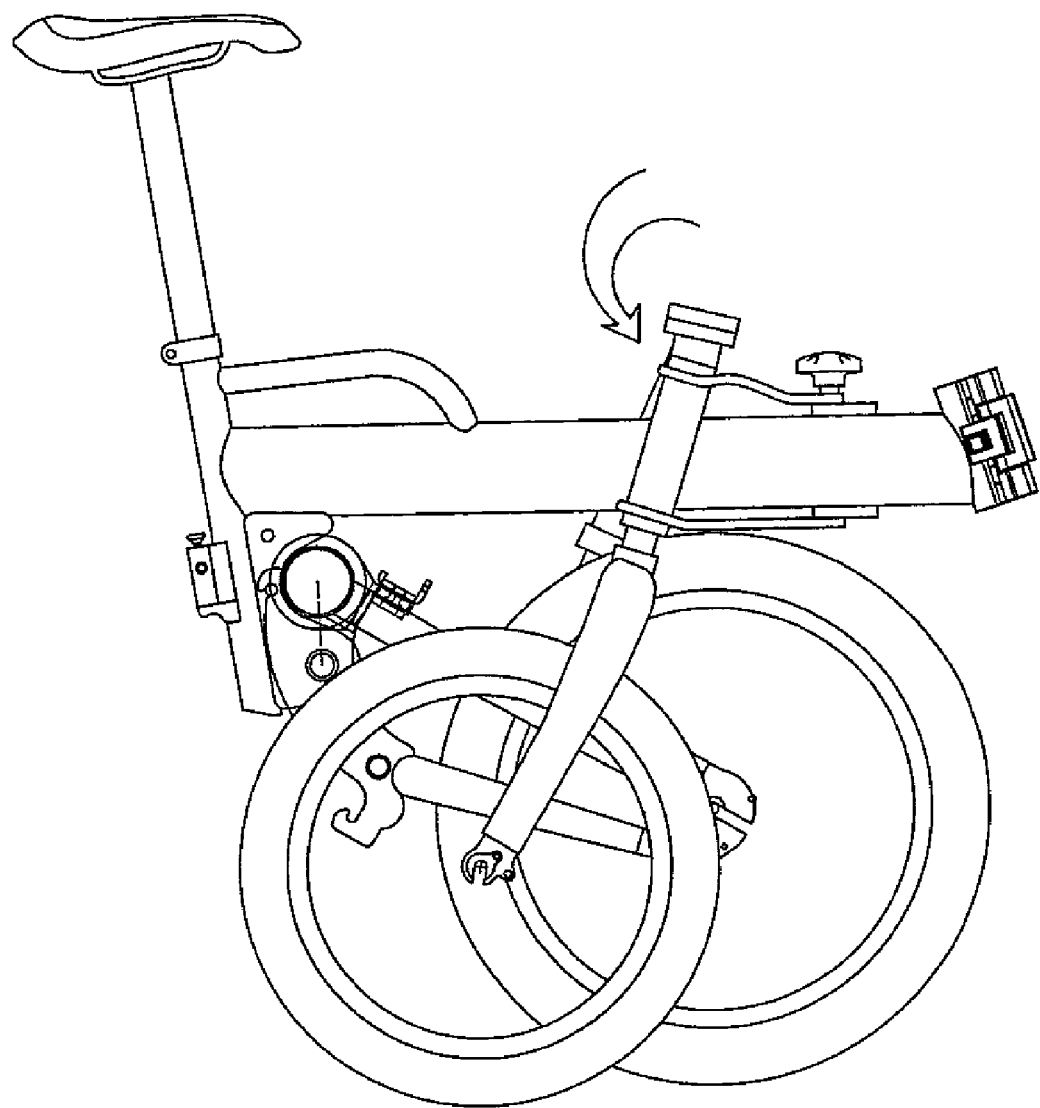
Figure 26:
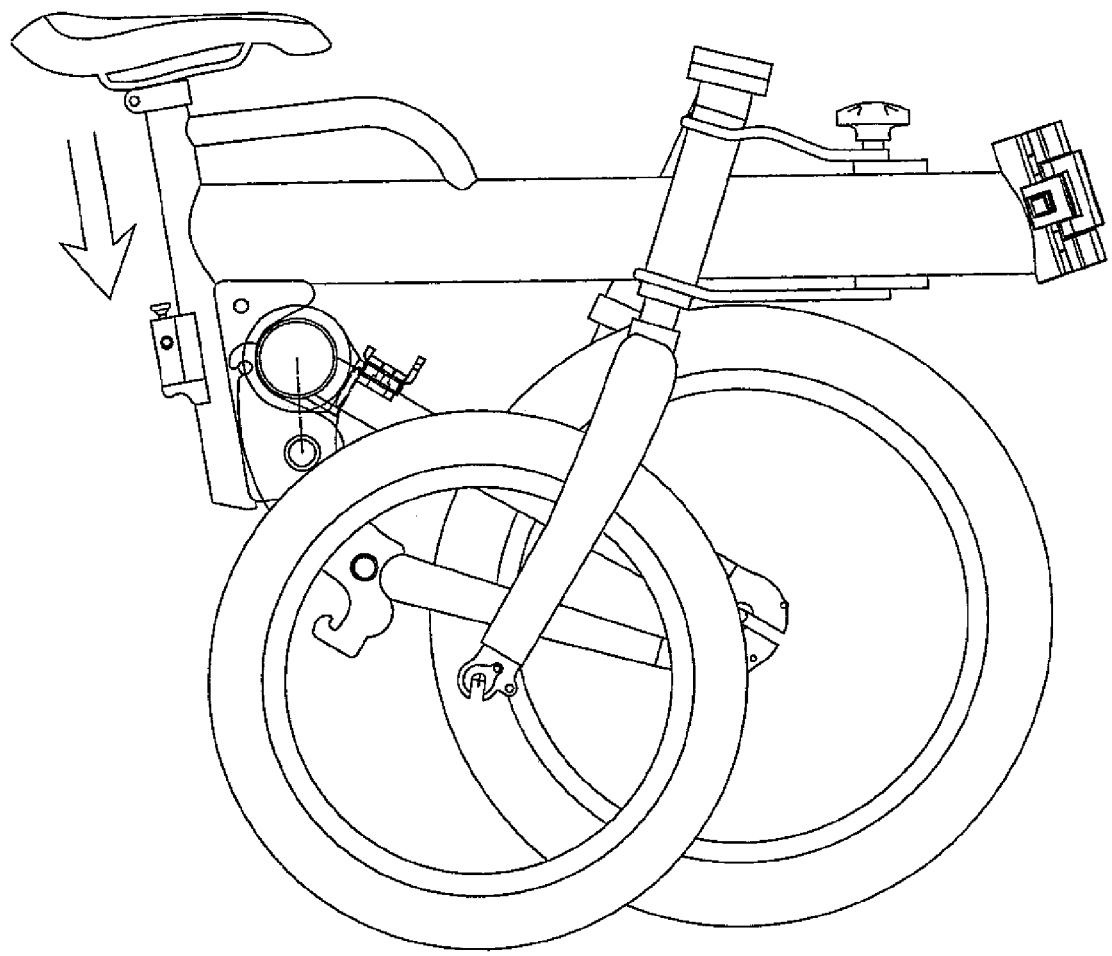

FIG. 20 is an alternative joint means which may be used instead for folding the front part 101. This joint means is explained in further detail in the below illustration of the second embodiment of the present invention.

Figure 39A:
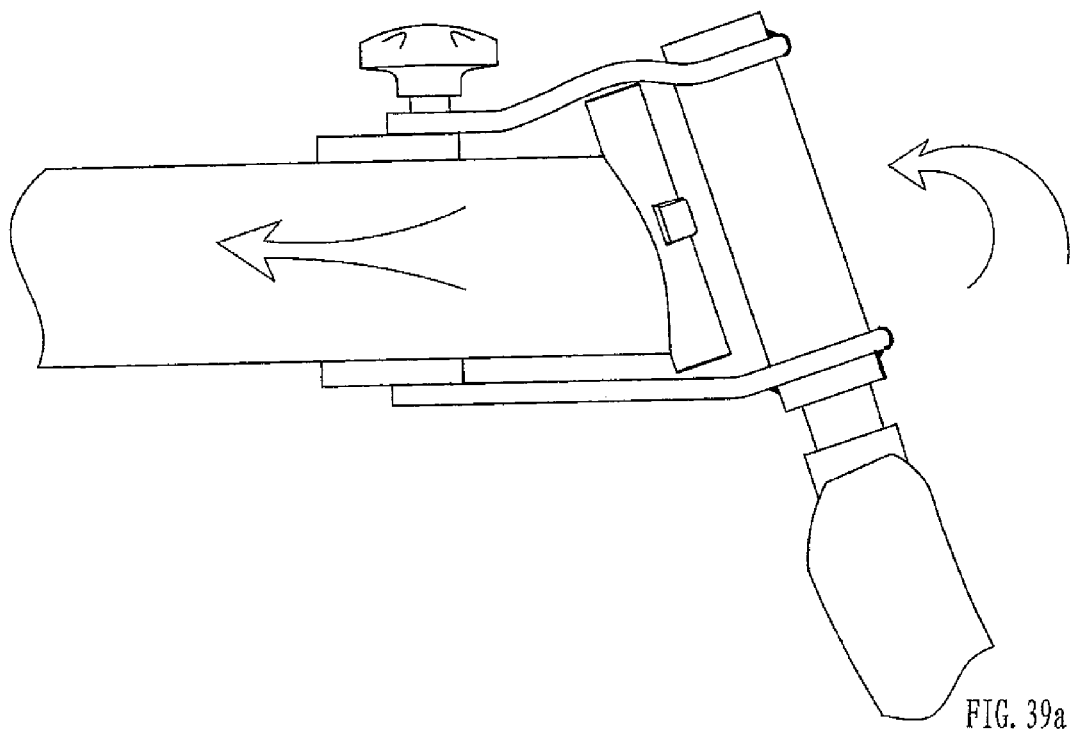
Figure 39B:
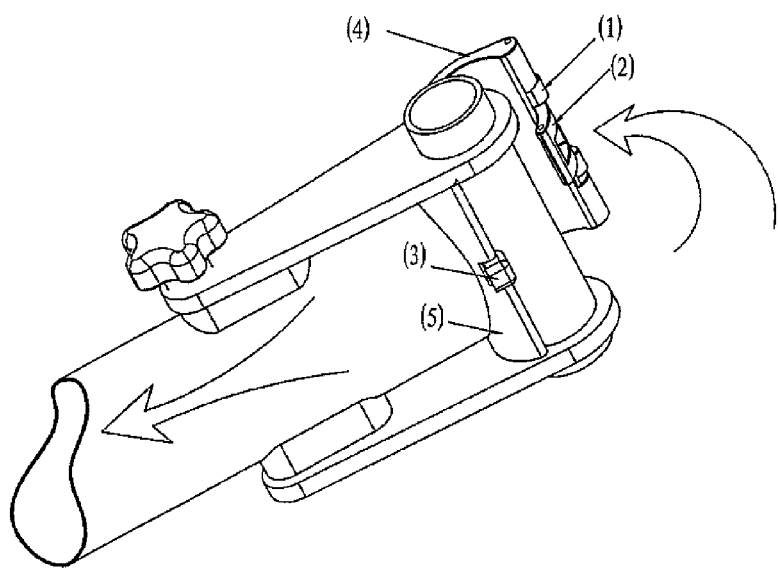
Figure 40A:
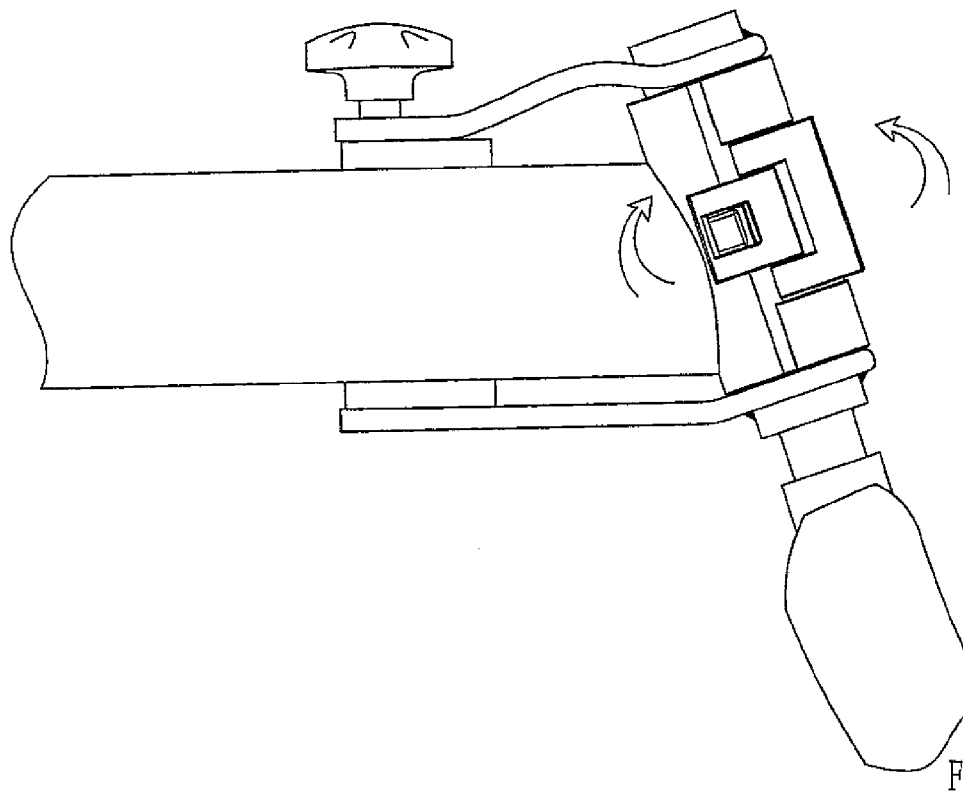
Figure 40B:
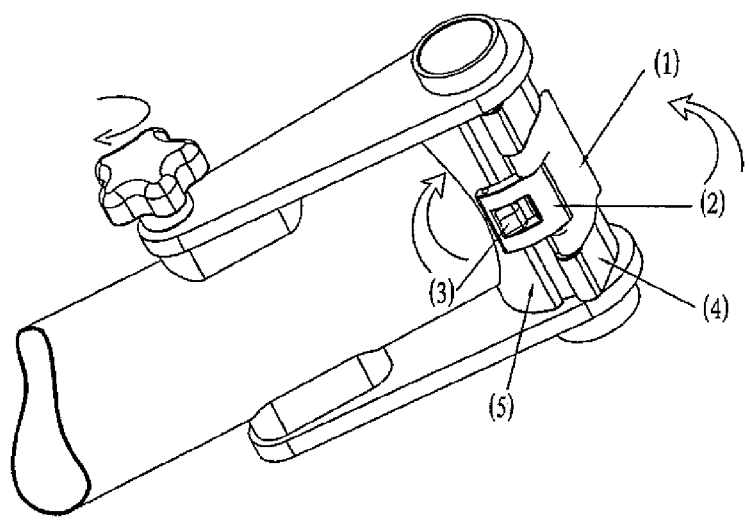

A second embodiment of a land vehicle also in the form of a bicycle, generally designated 200, is shown. As shown in FIGS. 21 to 40, the second embodiment is similar to the first embodiment in terms of the general principle of operation which is not repeated here. The following description of the bicycle 200 generally uses corresponding terminology and focuses on the differences between the first and second embodiments. In the second embodiment, the bicycle 200 similarly comprises a front part 202, a main frame 204, a rear part 206, a first folding means 208 for folding the first part 202 to the side of the main frame 204 and a second folding means 207 for folding the rear part 206 below the main frame 204. However, the first joint means 208 comprises a floating hinge 210 including an upper plate 212 and a lower plate 214. The upper plate 212 is arranged above a support tube 216 of the main frame 204 of the bicycle 200, and is welded to a lower part 218 of a column 220 extended from a headset 222 at a region just below an assembly of two plates 224, 226. It is to be noted that the two plates 224, 226 (which are similar to the plates 139, 140 (see FIG. 1)) connect an upper part 228 and the lower part 218 of the column 220. The lower plate 226 is arranged above the support tube 216, and is also welded to the column 220 but at a region just above a front fork of the front part 202. The position of the front part 202 as well as the upper and lower plates 212, 214 in relation to the support tube 216 is maintained by tightening a bolt 234 that passes through the upper plate 212, the support tube 216 and the lower plate 214. It is envisaged that when a latch 236 of a bracket member 238 of the first folding means 208 is unlocked, the bracket member 238 is open thus releasing the front part 202 therefrom. To facilitate the folding of the front part 202 to the side of the main frame 204, the bolt 234 is loosened thus allowing the front part 202 to be able to move slightly forward or backward as it is being folded to the side of the main frame 204, as shown in, for example, FIGS. 24, 33a and 33b. Conversely, when the front part 202 is to be unfolded, the bolt 234 is similarly firstly loosened such that the bolt 234 together with the two plates 212, 214 may be moved forward at the floating hinge 210, as shown in FIGS. 38a to 39a. The front part 202 is then swung forward from the side of the main frame 204 first, and then retracted slightly such that the column 220 of the front part 202 is received in the bracket member 238, as shown in FIG. 39b. The front part 202 is then secured in the unfolded position when the latch 236 of the bracket member 238 is locked and the bolt 234 of the floating hinge 210 is tightened, as shown in FIGS. 40a and 40b. Such a joint means may also be used instead in the first embodiment of the bicycle 100.

Figure 27:
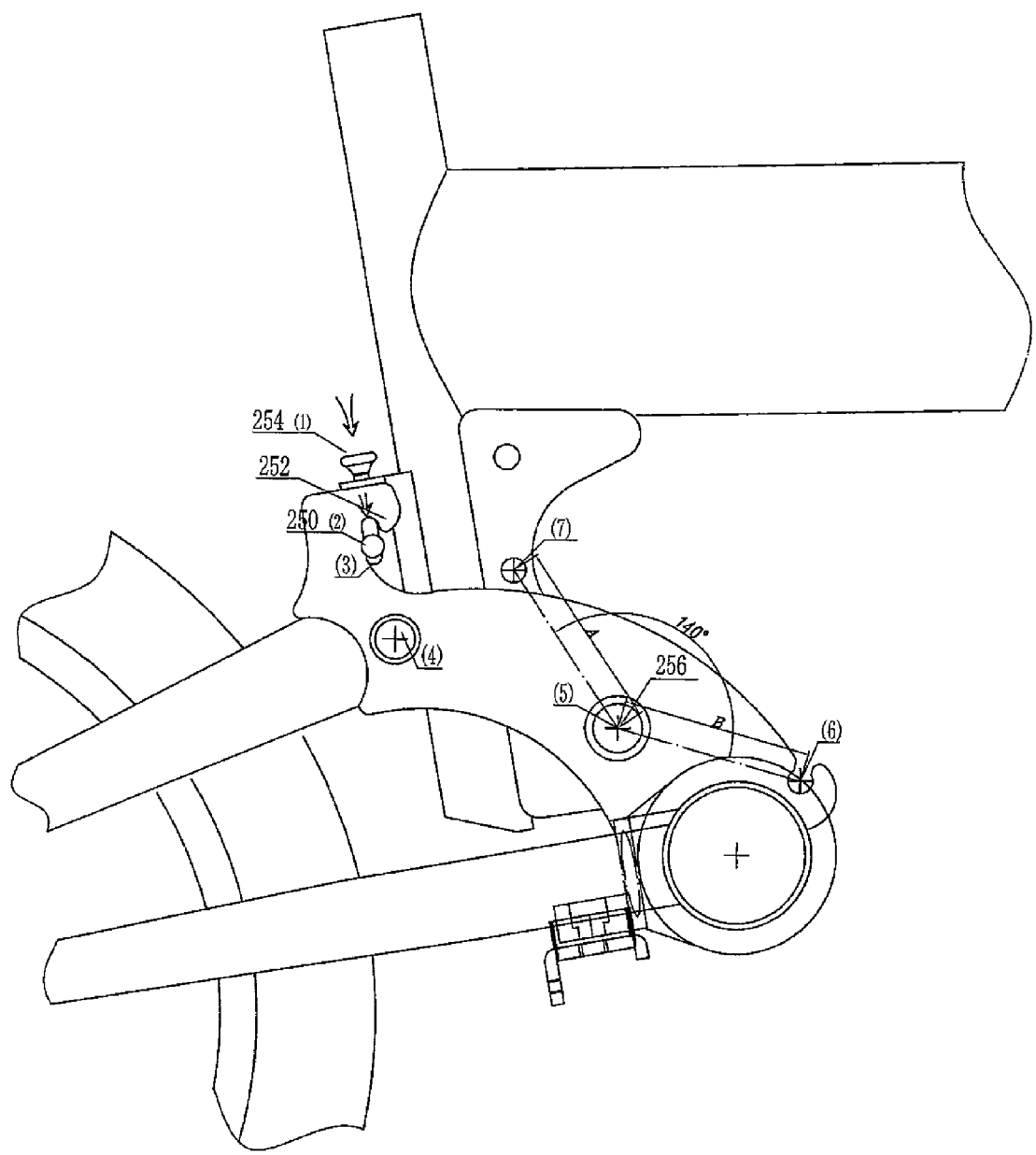
Figure 28:
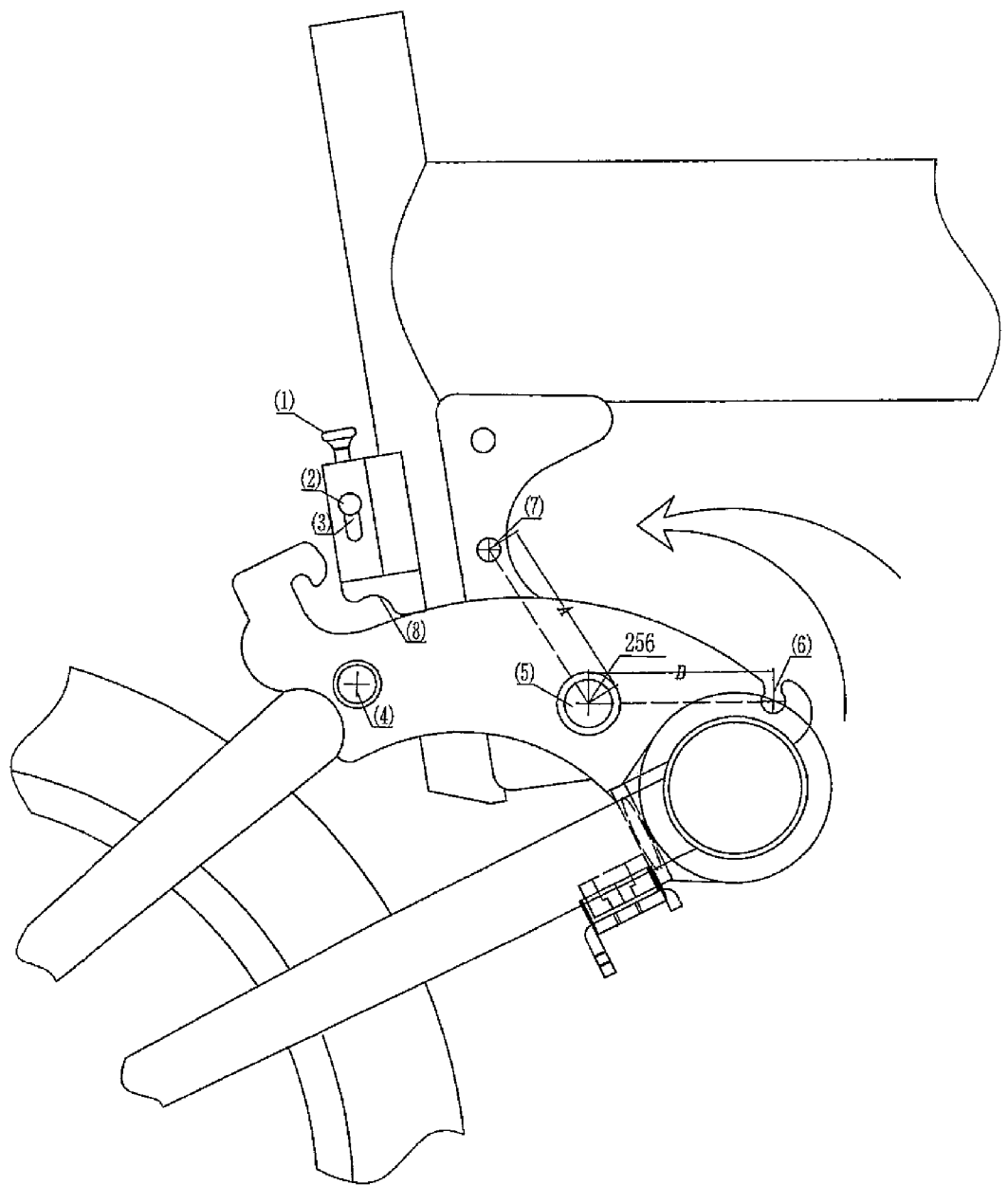
Figure 29:
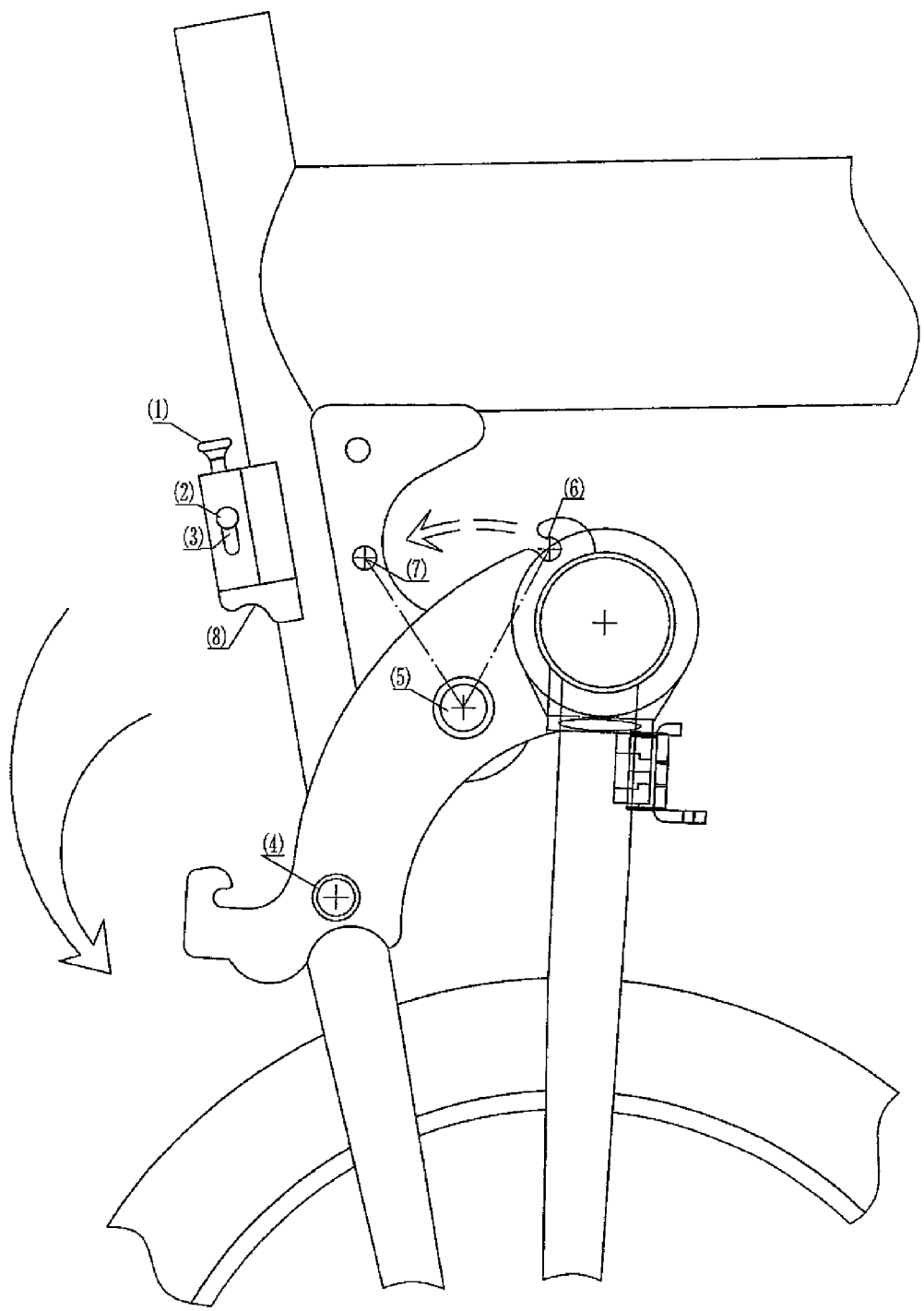
Figure 30:
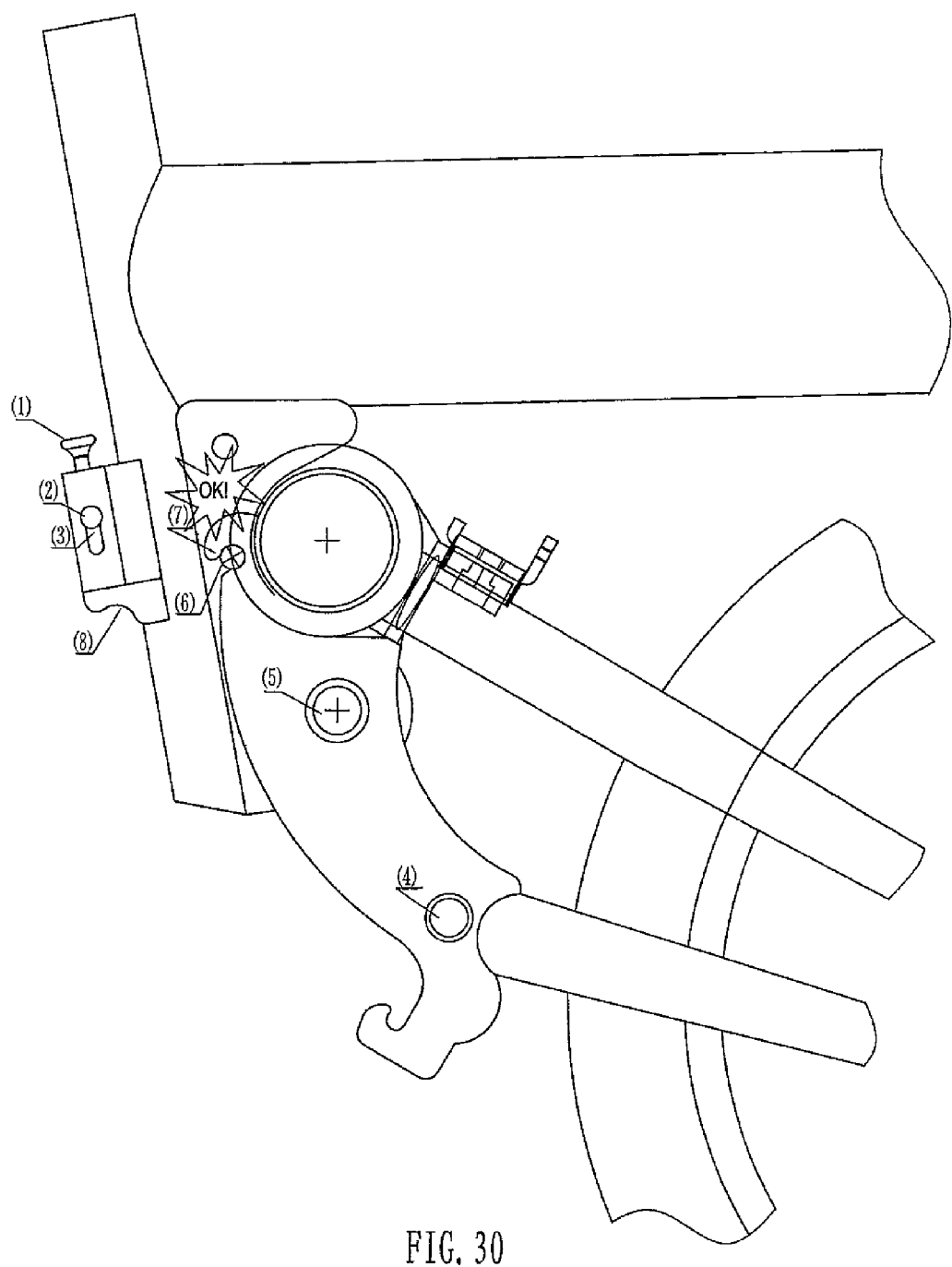
Figure 31A:
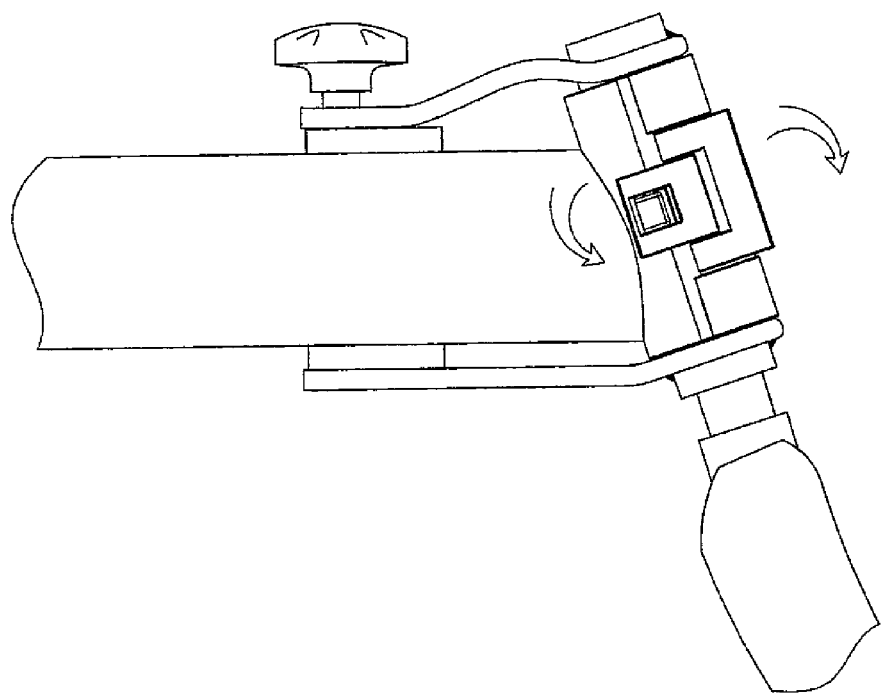
FIG. 31a is side view of a folding means for folding a first part of the bicycle of FIG. 21.
Figure 31B:
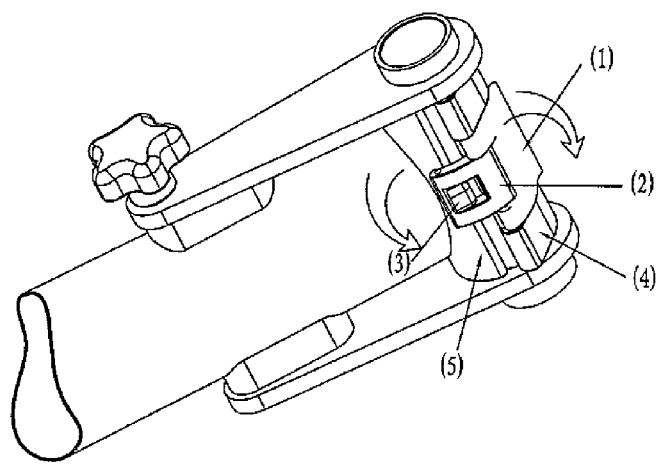
FIG. 31b is a perspective view of the folding means of FIG. 31a, FIGS. 32a to 33b illustrate the operation of the folding means of FIG. 31a, FIGS. 34 to 37 illustrate detailed steps of unfolding the rear part of the bicycle of FIG. 21, and FIGS. 38a to 40b illustrate detailed step of unfolding of the front part of the bicycle of FIG. 21.
Figure 32A:
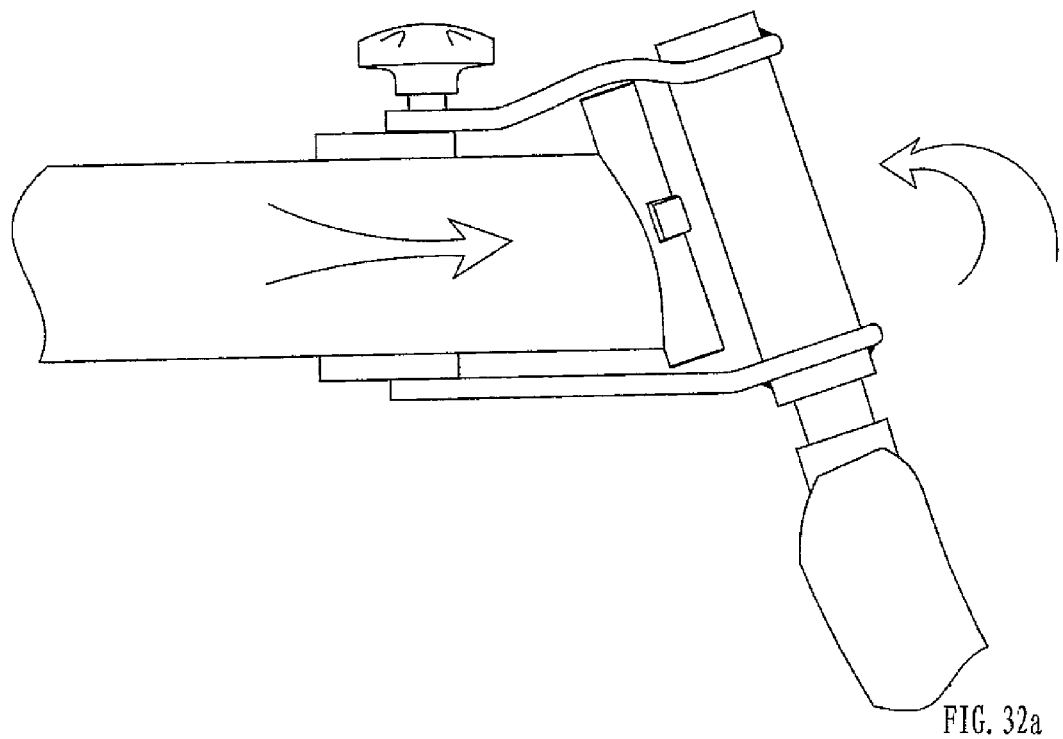
Figure 32B:
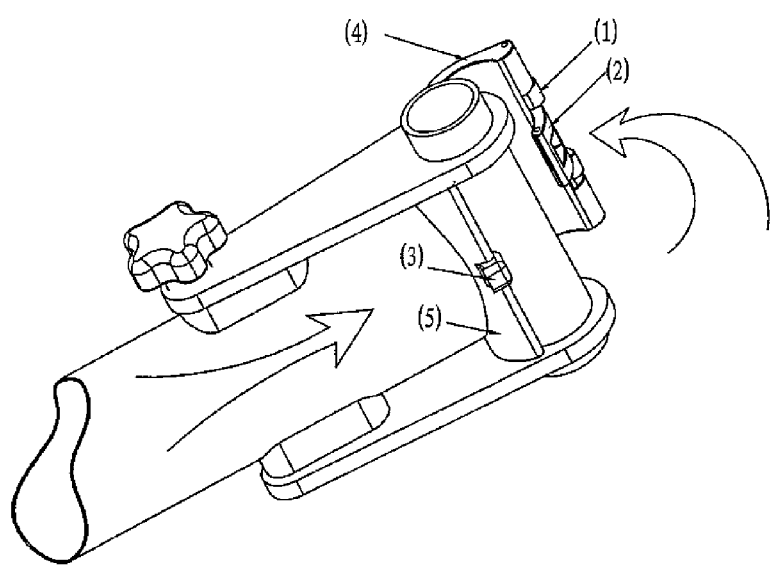
Figure 33A:
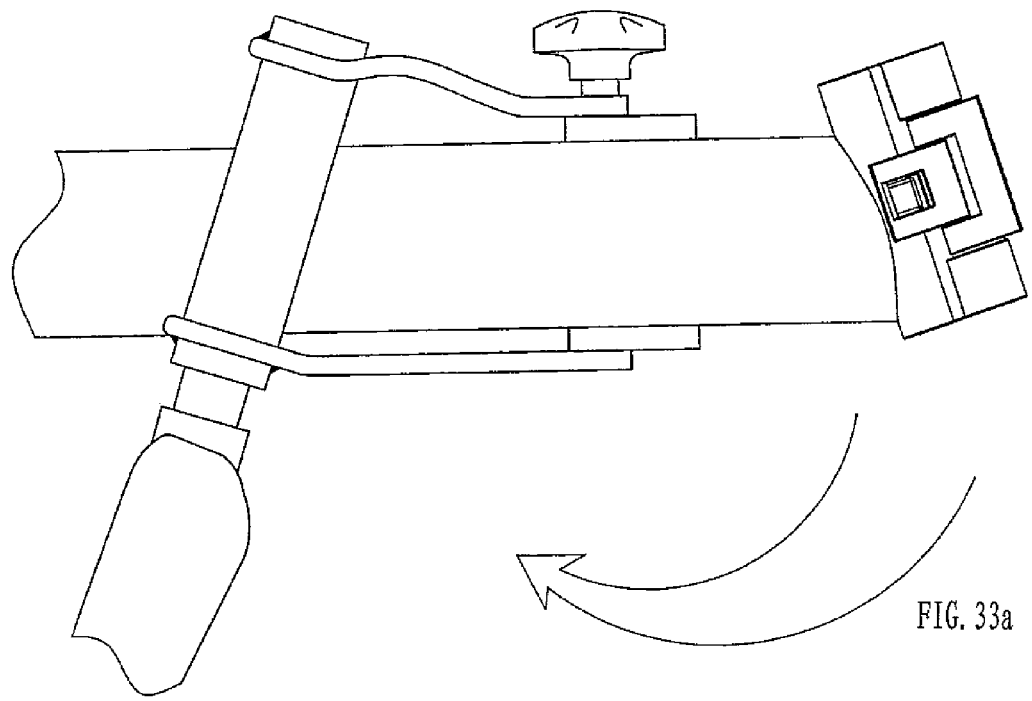
Figure 33B:
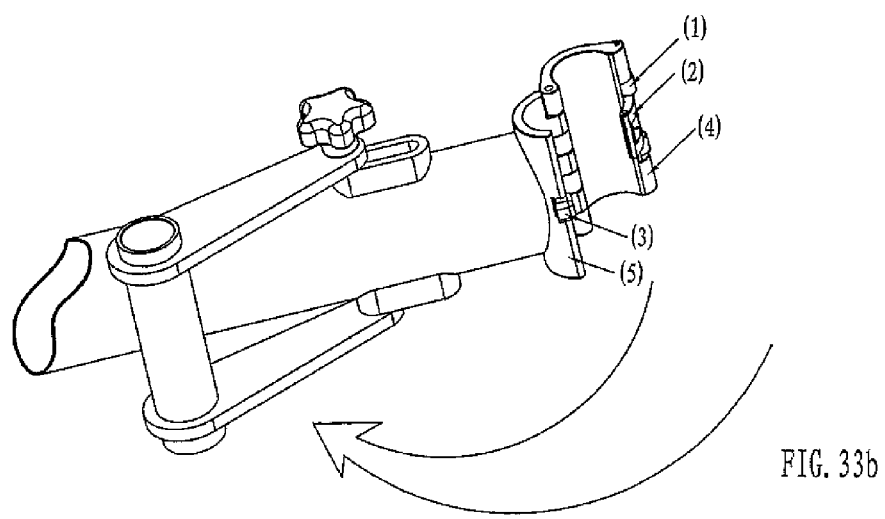
Figure 34:
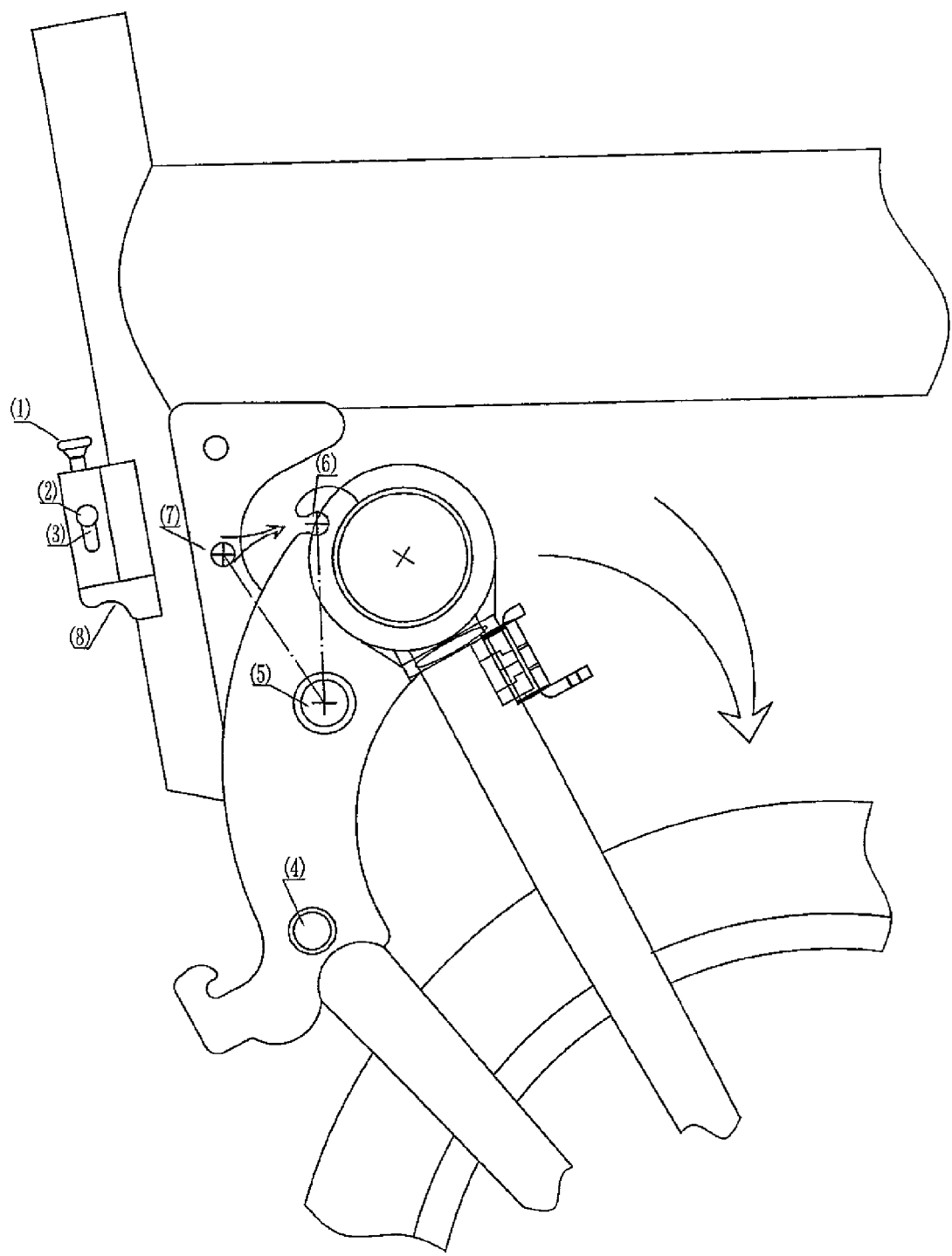
Figure 35:
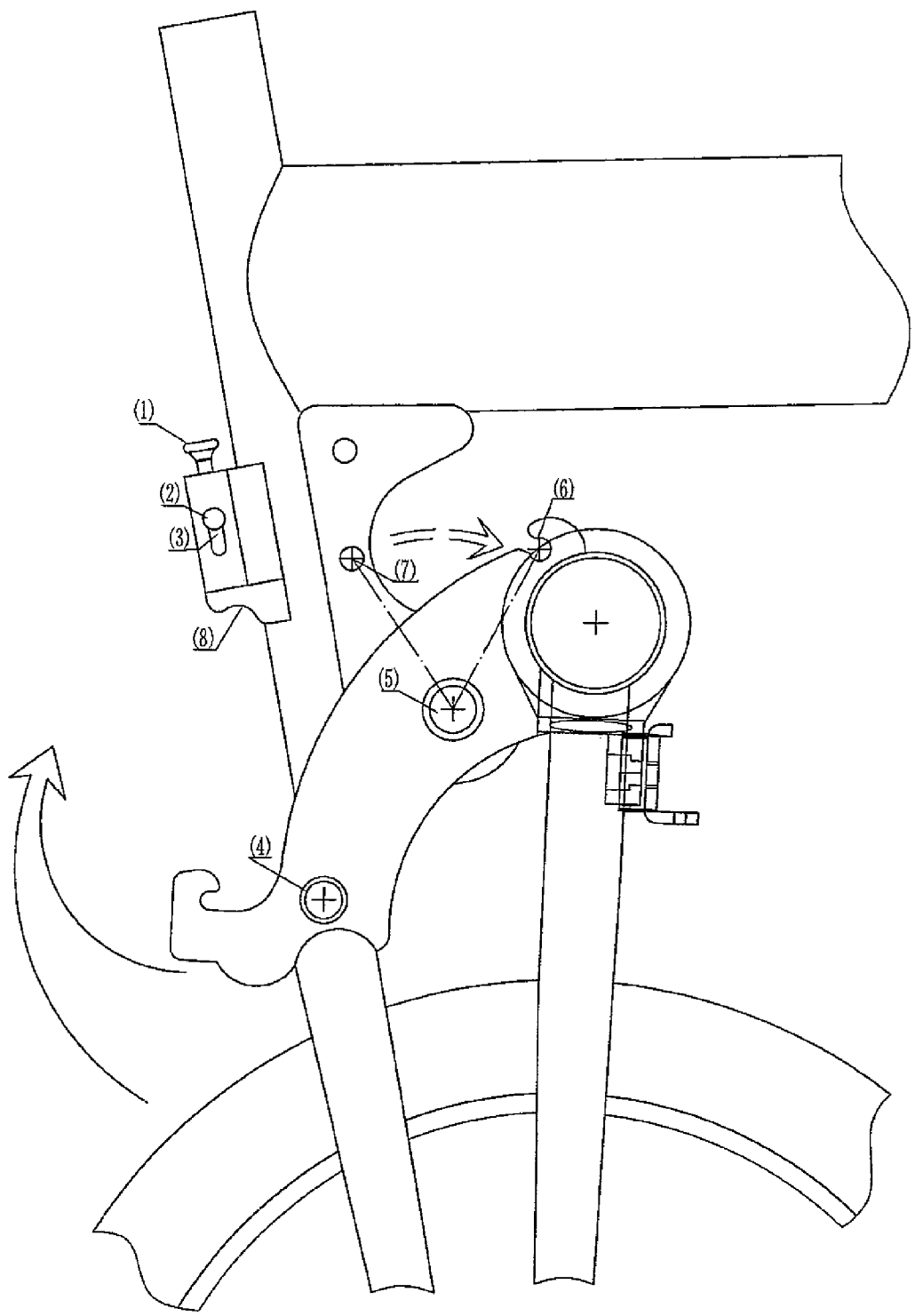
Figure 36:
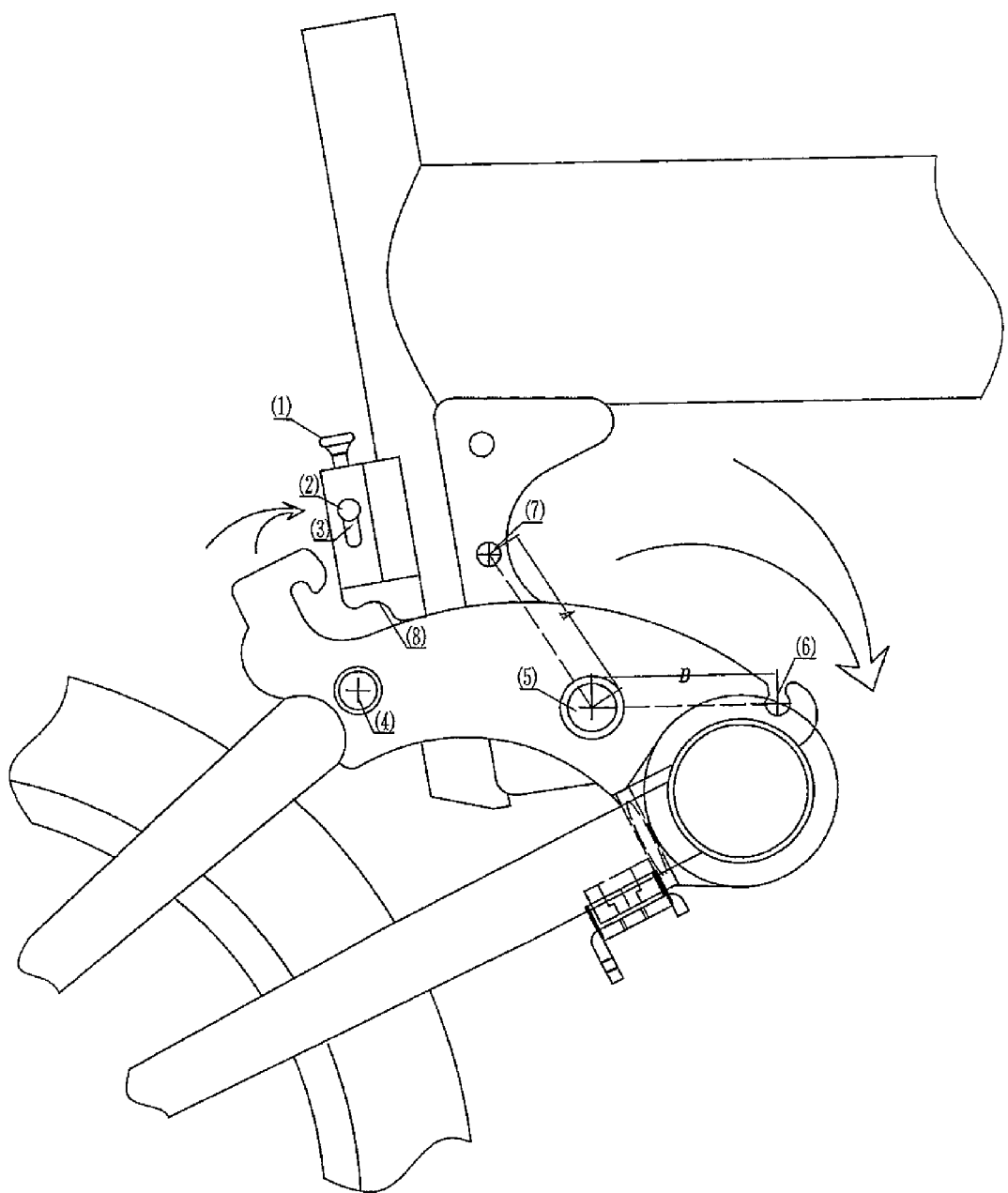
Figure 37:
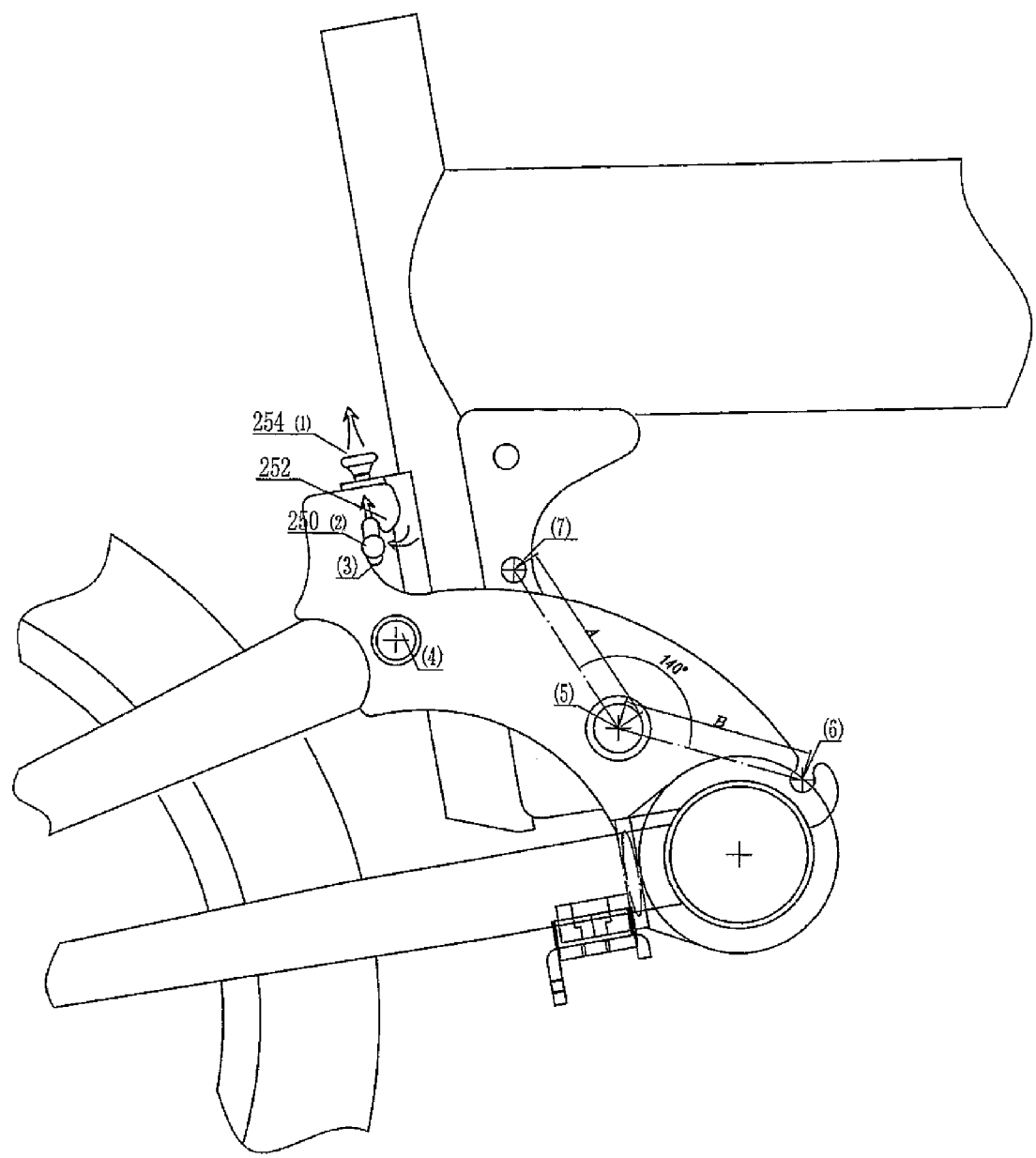
Figure 38A:
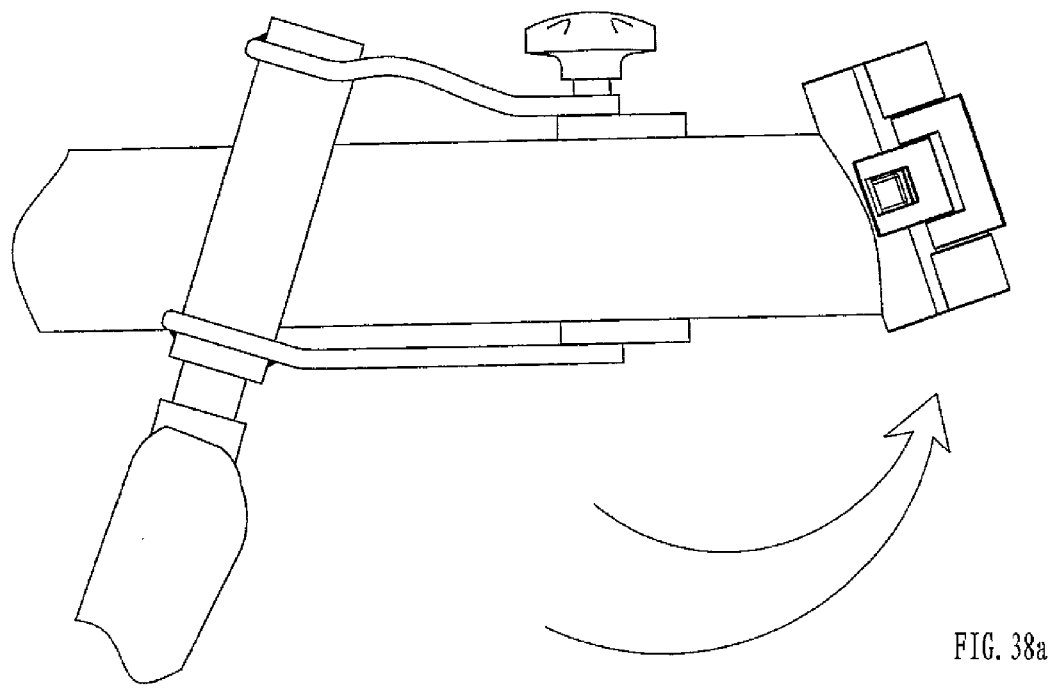
Figure 38B:
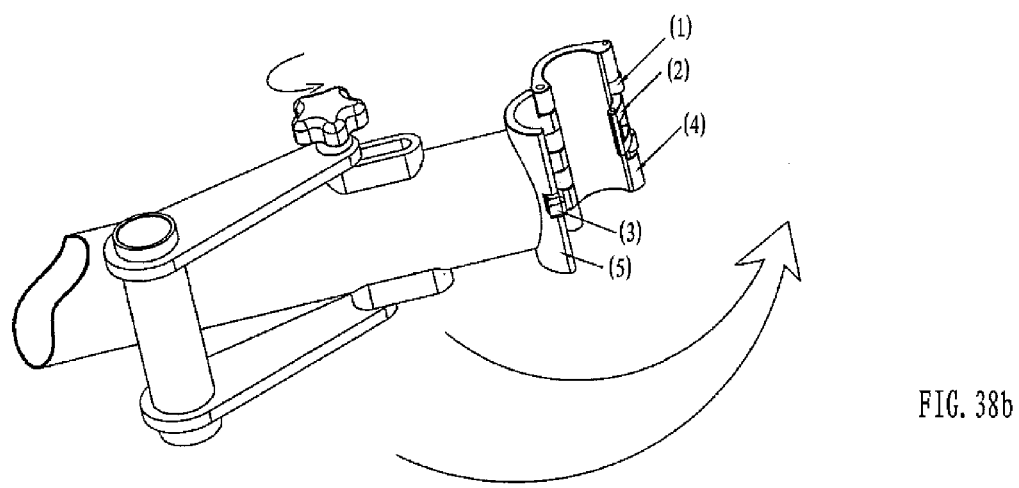

In the second embodiment, the rear part 206 of the bicycle 200 and the second joint means 207 are different in a number of ways. First, instead of providing only one pair of bars in the rear part 206 of the bicycle 200, two pairs of bars are provided, as shown in at least FIGS. 21, 22a and 27. In other words, there is a pair of upper bars 240 and a pair of lower bars 242. The provision of two pairs of bars provides a stronger support for the bicycle 200 and is suitable for use by heavier users. The rear part 206 comprises a pair of plates 244, one on each side of the bicycle 200. A lower region of the right plate 244 is connected to the right crank which is connected to the lower bar at the right side. An upper region of the right plate 244 is connected to the upper bar 240 at the right side. The pair of bars 240, 242 at the right side is connected to the right side of a rear wheel 246. There is a similar arrangement in the left side of the rear part 206. There is a first locking means 248 (similar to the locking means 118 in the first embodiment) for locking the rear part 206 in place with the main frame 204 in an unfolded position. In particular, as for example shown in FIG. 23 the locking means 248 is provided with a movable bar having a laterally extending lug 250 which is sized and shaped to be received in a hook-like member 252 (see FIG. 23) provided at an upper part of the plates. In an unfolded position, the lug 250 (also see FIG. 23) is received in the hook-like member 252 and secures the plates 244 and the rear part 206 in the position, as shown in FIG. 37. When the rear part 206 is to be folded to the main frame 204, the lug 250 is downwardly moved by pushing an enlarged upper end 254 of the bar connected to the lug 250 and releasing the lug 250 from the hook-like member 252, as shown in FIGS. 27 and 28. The rear part 206 may then first be downwardly moved and travels via an arc at a pivot 256 until it is fully folded with the main frame 204, as shown in FIGS. 29 to 30 and the unfolding is similar to that in the first embodiment. When the rear part 206 is fully folded with the main frame 204, it is locked in the folded position with a locking means similar to the first locking means just described above, as shown in FIG. 29. FIGS. 34 to 37 illustrate the unfolding of the rear part to its unfolded position, which is generally reversing the steps of folding the bicycle 200.

It is envisaged that the present invention is applicable not only to bicycles, but also to motor bicycles and exercise bicycles and in fact any vehicles such as any land vehicles having a rear part, a front part and a main frame. The above embodiments are just examples for illustrating the invention and is not to be considered limitations to the present invention.

The invention claimed is:

1. A foldable land vehicle comprising:
   (i) an elongate main frame including a support tube and generally defining a longitudinal axis running from a front end of said vehicle to a rear end of said vehicle;
   (ii) a front part including a front wheel;
   (iii) a rear part including a rear wheel;
   (iv) a first joint means for connecting said front part to said main frame and for folding said front part to a lateral side of said main frame; and
   (v) a second joint means for connecting said rear part to said main frame and for folding said rear part below said main frame;
   wherein said front part is movable between (a) an extended position in which said vehicle is operable and (b) a folded position in which said vehicle is in a stowed configuration;
   wherein said first joint means comprises releasable securing means for releasably securing said front part of said vehicle in the extended position, said releasable securing means located at a front end of said support tube, and
   wherein said releasable securing means is in the form of a cylindrical bracket at which said front part is secured in the extended position.

2. A vehicle as claimed in claim 1 wherein said bracket has a hinge defining a generally vertical axis, the vertical axis being generally perpendicular to the longitudinal axis of said main frame, wherein an overall length of said vehicle is substantially reduced by an amount about the same as a diameter of said front wheel.

3. A vehicle as claimed in claim 2 wherein said hinge is located at said support tube.

4. A vehicle as claimed in claim 3 wherein said vehicle is free of any means for folding said support tube of said main frame.

5. A vehicle as claimed in claim 1 wherein said rear part is adapted to be swivelable from an extended position to a stowed position whereby an overall length of said vehicle is reduced by an amount about the same as a diameter of said rear wheel.

6. A vehicle as claimed in claim 1 wherein said rear part is swivelable between an extended position and a stowed position between an angle in the range of 100° to 180°.

7. A vehicle as claimed in claim 1 further comprising means for biasing said rear part to an extended position.

8. A vehicle as claimed in claim 1 wherein said rear part comprises at least one bar connecting said rear wheel and said main frame.

9. A vehicle as claimed in claim 1 wherein said second joint means provides a pivot about which said rear part swivels.

10. A vehicle as claimed in claim 1 further comprising a first locking means for locking said rear part in place in an extended position such that said vehicle is operable.

11. A vehicle as claimed in claim 1 further comprising means for locking said rear part in place in a stowed position when said vehicle is in a folded configuration.

12. A vehicle as claimed in claim 1 wherein said vehicle is a foldable bicycle, a foldable motor bicycle or a foldable exercise bicycle.

13. A vehicle as claimed in claim 1 wherein said vehicle comprises a chainless transmission system that is free of any chain-type transmission mechanism.

14. A foldable land vehicle comprising:
   (i) an elongate main frame including a support tube and generally defining a longitudinal axis running from a front end of said vehicle to a rear end of said vehicle;
   (ii) a front part including a front wheel;
   (iii) a rear part including a rear wheel;
   (iv) a first joint means for connecting said front part to said main frame and for folding said front part to a lateral side of said main frame; and
   (v) a second joint means for connecting said rear part to said main frame and for folding said rear part below said main frame;
   wherein said front part is movable between (a) an extended position in which said vehicle is operable and (b) a folded position in which said vehicle is in a stowed configuration;
   wherein said first joint means comprises releasable securing means for releasably securing said front part of said vehicle in the extended position, said releasable securing means located at a front end of said support tube, and wherein said first joint means is provided with a stud and a plate member connecting said front part to said stud, said front part is pivotable about said stud, and said plate member is connected to a lower end of said stud by a universal-type joint.

15. A foldable land vehicle comprising:
   (i) an elongate main frame including a support tube and generally defining a longitudinal axis;
   (ii) a front part including a front wheel;
   (iii) a rear part including a rear wheel;
   (iv) a first joint means for connecting said front part of said vehicle to said main frame; and
   (v) a second joint means for connecting said rear part of said vehicle to said main frame;
   wherein said first joint means comprises a cylindrical bracket having a hinge defining a generally vertical axis, the vertical axis being generally perpendicular to the longitudinal axis of said main frame; and
   wherein said front part is adapted to be movable between (a) an extended position in which said front part is secured by said bracket and said vehicle is operable and (b) a folded position in which said front part is released from said bracket and said vehicle is in a stowed configuration whereby an overall length of said vehicle is substantially reduced by an amount about the same as a diameter of said front wheel; and, wherein said foldable land vehicle is free of any means for folding said support tube.

16. A foldable land vehicle comprising:
(i) an elongate main frame including a support tube and generally defining a longitudinal axis running from a front end of said vehicle to a rear end of said vehicle;
(ii) a front part including a front wheel;
(iii) a rear part including a rear wheel;
(iv) a first joint means for connecting said front part to said main frame;
(v) a second joint means for connecting said rear part to said main frame and for folding said rear part below said main frame; and
(vi) a chainless transmission system that is free of any chain-type transmission mechanism for propelling the vehicle;

wherein said vehicle is configured such that said rear part is movable between (a) an extended position in which said vehicle is operable and (b) a folded position in which said vehicle is in a stowed configuration such that said rear part is disposed below said main frame by being folded about a horizontal axis substantially perpendicular to the longitudinal axis of said main frame; and wherein said first joint means comprises releasable securing means for releasably securing said front part of said vehicle in an extended operable position, said releasable securing means located at a front end of said support tube.

* * * * *

UNITED STATES PATENT AND TRADEMARK OFFICE
CERTIFICATE OF CORRECTION

| | | |
|---|---|---|
| PATENT NO. | : 7,651,109 B2 | Page 1 of 1 |
| APPLICATION NO. | : 11/424252 | |
| DATED | : January 26, 2010 | |
| INVENTOR(S) | : Wai Lop Tong | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this

Twenty-third Day of November, 2010

David J. Kappos
*Director of the United States Patent and Trademark Office*